United States Patent
Li et al.

(10) Patent No.: US 7,716,688 B2
(45) Date of Patent: May 11, 2010

(54) SYSTEM FOR OBJECT DISCOVERY IN HETEROGENOUS OBJECT SYSTEMS

(75) Inventors: Jun Li, Mountain View, CA (US); Keith E. Moore, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1730 days.

(21) Appl. No.: 10/850,406

(22) Filed: May 21, 2004

(65) Prior Publication Data

US 2005/0262111 A1  Nov. 24, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................................... 719/330
(58) Field of Classification Search .................. 719/330
See application file for complete search history.

(56) References Cited

U.S. PATENT DOCUMENTS

| | | | |
|---|---|---|---|
| 5,732,270 A * | 3/1998 | Foody et al. ................. | 719/316 |
| 6,085,030 A * | 7/2000 | Whitehead et al. .......... | 709/203 |
| 6,223,217 B1 * | 4/2001 | Pettus ......................... | 709/219 |
| 6,282,581 B1 | 8/2001 | Moore et al. | |
| 6,349,343 B1 | 2/2002 | Foody et al. | |
| 6,408,342 B1 | 6/2002 | Moore et al. | |
| 6,453,362 B1 * | 9/2002 | Bittinger et al. ............. | 719/316 |
| 6,571,252 B1 * | 5/2003 | Mukherjee ............... | 707/103 R |
| 6,868,543 B1 * | 3/2005 | Nusbickel .................... | 719/318 |
| 6,898,792 B1 * | 5/2005 | Burke .......................... | 719/315 |
| 6,934,952 B2 * | 8/2005 | Sarkar et al. ................. | 719/310 |
| 7,237,012 B1 * | 6/2007 | Duncan et al. ............... | 709/217 |
| 7,325,240 B2 * | 1/2008 | Yamamoto et al. .......... | 719/330 |
| 7,353,521 B1 * | 4/2008 | Jin ............................... | 719/330 |
| 2002/0147856 A1 * | 10/2002 | Sarkar et al. ................. | 709/313 |
| 2004/0015540 A1 * | 1/2004 | Solano et al. ................ | 709/203 |
| 2004/0019898 A1 * | 1/2004 | Frey et al. .................... | 719/330 |

OTHER PUBLICATIONS

Siyan, Karanjit S. "Inside Visual J++", Nov. 1996, Chapter 14 & 15.

* cited by examiner

*Primary Examiner*—Hyung S Sough
*Assistant Examiner*—KimbleAnn Verdi

(57) ABSTRACT

A system for object discovery in heterogeneous object systems includes a fixed object system having a registry. A callee object having a rendezvous name is registered in the registry of the fixed object system under the rendezvous name. The system also includes an adaptive object system having a remote procedure call protocol abstraction layer. The remote procedure call protocol abstraction layer is configured to access the registry of the fixed object system.

50 Claims, 14 Drawing Sheets

SYSTEM FOR OBJECT DISCOVERY IN HETEROGENOUS OBJECT SYSTEMS

BACKGROUND

Distributed and parallel systems form a very important segment of modem computing environments. Experience with such systems has exposed several requirements of system and component designs that have historically been recognized only after a system has been deployed. A critical requirement (especially for systems with any longevity) is the need for the system and system components to be able to evolve over time.

By definition, a distributed system is one which contains components which need to communicate with one another. In most practical systems, however, many of these components will not be created "from scratch". Components tend to have long lifetimes, be shared across systems, and be written by different developers, at different times, in different programming languages, with different tools. In addition, systems are not static—any large scale system will have components that must be updated, and new components and capabilities will be added to the system at different stages in its lifetime. The choice of platform, the level of available technology, and the current fashion in the programming community all conspire to create what is typically an integration and evolution nightmare.

The most common solution to this problem is to attempt to avoid it by declaring that all components in the system will be designed to a single distributed programming model and will use its underlying communication protocol. This approach tends not to work well for several reasons. First, by the time the decision has been made to use one model or protocol (which may be quite early in the life cycle of a system) there may already be existing components which there is a desire to use, but which do not support the selected model or protocol. Second, the choice of model and protocol may severely restrict other choices (e.g., the language in which a component is to be written or the platform on which it is to be implemented) due to the availability of support for the model.

Finally, such choices tend to be made in the belief that the ultimate model and protocol have finally been found, or at least that the current choice is sufficiently flexible to incorporate any future changes. That belief has, historically, been discovered to be unfounded—a situation which is not likely to change. Invariably, a small number of years down the road (and often well within the life of an existing system), a new "latest and greatest" model is invented, and the owner of the system is faced with the choice of adhering to the old model (which may leave the system unable to communicate with other systems and restrict the capabilities of new components) or upgrade the entire system to the new model. This approach is always an expensive option, and may in fact be intractable (for instance, it is not unheard of for systems to contain an investment of hundreds of man-years in "legacy" source code) or even impossible (as, for example, when the source code for a component is simply not available).

An alternative solution accepts the fact that a component or set of components may not speak the common protocol, and provides proxy services (also known as "protocol wrappers" or "gateways") between the communication protocols. Under this scheme, the communication is first sent to the proxy service, which translates it into the non-standard protocol and forwards it on to the component. This technique typically gives rise to performance issues (due to message forwarding), resource issues (due to multiple in-memory message representations), reliability issues (due to the introduction of new messages and failure conditions), as well as security, location, configuration, and consistency problems (due to the disjoint mechanisms used by different communication protocols).

It is tempting to think that this problem is merely a temporary condition caused by the recent explosion in the number of protocols (and that things will stabilize soon) or that the problem is just an artifact of poor design in legacy components (and won't be so bad next time). However the problem of protocol evolution is intrinsic in building practical distributed systems. There will always be "better" protocols, domain specific motivations to use them, and "legacy" components and protocols that must be supported. Indeed, nearly any real distributed system will have at least three models: those of "legacy" components, the current standard, and the emerging "latest and greatest". The contents of these categories shift with time—today's applications and standard protocols will be tomorrow's legacy. Systems and components evolve along multiple dimensions:

Evolution of Component Interface

A component's interface may evolve to support new features. The danger is that this evolution will require all clients of the component to be updated. For reasons cited in the previous section, there must be a mechanism whereby old clients can continue to use the old interface, yet new clients can take advantage of the new features.

Evolution of Component Implementation

A component's implementation may evolve independently of the rest of the system. This may include the relocation of a component to a new hardware platform or the reimplementation of a component in a new programming language. There must be a mechanism which insulates other components from these changes in the implementation yet maintains the semantic guarantees promised by the interface.

Evolution of Inter-Communication Protocol

It is generally intractable to chose a single communication protocol for all components in the system as new protocols are attractive due to their performance, availability, security, and suitability to the application's needs. Each communication protocol has its own model of component location, component binding, and often a model of data/parameter representation. It must be possible to change or add communication protocols without rendering existing components inaccessible.

Evolution of Inter-Component Communication Model/API

The programming models used to perform inter-component communication continue to evolve. Existing models change over time to support new data types which can be communicated and new communication semantics. At the same time, new programming models are frequently developed which are attractive due to their applicability to a particular application, their familiarity to programmers on a particular platform, or merely current fashion or corporate favor. It must be possible to implement components to a new model or a new version of an existing model without limiting the choice of protocols to be used underneath and without sacrificing interoperability with existing components written to other models or other versions of the same model (even when those components will reside in the same address space).

Distributed Object Systems such as CORBA and COM, like the Remote Procedure Call models which preceded them, address the issue of protocol evolution to a degree by separating the programming model from the details of the underlying protocol which is used to implement the communication. These systems do so by introducing a declarative Interface Definition Language (IDL) and a compiler which generates code that transforms (or allows the transformation of) a protocol neutral Application Protocol Interface (API) to the particular protocol supported by the model. As the protocol changes (or new protocols become available), the compiler can be updated to generate new protocol adapters to track the protocol evolution.

A side benefit of IDL is that it forces each component's interface to be documented and decouples a component's interface from its implementation. This allows an implementation to be updated without affecting the programming API of clients and simplifies the parallel development of multiple components.

In CORBA and COM, interfaces are reflective—a client can ask an implementation object whether it supports a particular interface. Using this dynamic mechanism, a client can be insulated from interface (as well as implementation) changes as clients familiar with a new interface (or a new version of an interface) ask about it, while old clients restrict themselves to using the old interface.

While such systems abstract the choice of communication protocol, none addresses the situation in which a system needs to be composed of components that cannot all share a single protocol or a single version of a protocol. CORBA and COM have each defined a protocol that all components "will eventually adopt". For reasons cited above, that solution is merely the addition of yet another (incompatible) protocol to the mix—a protocol which will evolve, and in fact is already evolving.

For all of these reasons, having a single protocol in a long-lived, large-scale system, is unrealistic. There will be evolution of protocols (IIOP 1.0, 2.0, 3.0) and simultaneous and incompatible protocols (MS-RPC, DCOM, SOAP/.NET) in these systems. One issue is the different encoding rules between the protocols (this is addressed in U.S. Pat. Nos. 6,282,581 and 6,408,342, issued to Moore et al.). A second issue involves handling the differences in discovery, registration and rendezvous mechanism.

One approach to handling these differences is disclosed in U.S. Pat. No. 6,349,343 (the '343 patent) issued to Foody et al. The '343 patent discloses that a bridge is created between DSOM, ORBIX, and COM by the introduction of "proxy objects". The proxy objects are created at the application level and are knowledgeable about conversions between the various protocols. One drawback to the use of the "proxy objects" described in the '343 patent is that they are created as specific interface application level proxies. In addition, administrative tools are needed for registering the "proxy objects", thus requiring relatively complicated configurations to enable their implementations.

Another approach is VJ++/COM disclosed in chapters 14 and 15 of "Inside Visual J++" by Karanjit Siyan, published by NewRiders. Siyan discloses the use of a virtual machine that has knowledge of how to dispatch calls from Visual J++ to COM. Siyan also discloses that the virtual machine has additional knowledge of how Visual J++ objects can be registered as COM objects through command line activation. The virtual machine of Siyan requires the use of specialized opcodes for the Java virtual machine. In addition, only a single fixed object system (i.e., COM) is supported in the VJ++/COM approach disclosed in Siyan, which substantially limits the accessibility of the VJ++/COM approach.

SUMMARY

In accordance with an example, a system for object discovery in heterogeneous object systems is disclosed. The system includes a fixed object system having a registry. A callee object having a rendezvous name is registered in the registry of the fixed object system under the rendezvous name. The system also includes an adaptive object system having a remote procedure call protocol abstraction layer. The remote procedure call protocol abstraction layer is configured to access the registry of the fixed object system.

BRIEF DESCRIPTION OF THE DRAWINGS

Embodiments of the invention are illustrated by way of example and without limitation in the accompanying figures in which like numeral references refer to like elements, and wherein.

DETAILED DESCRIPTION

Figure 1:
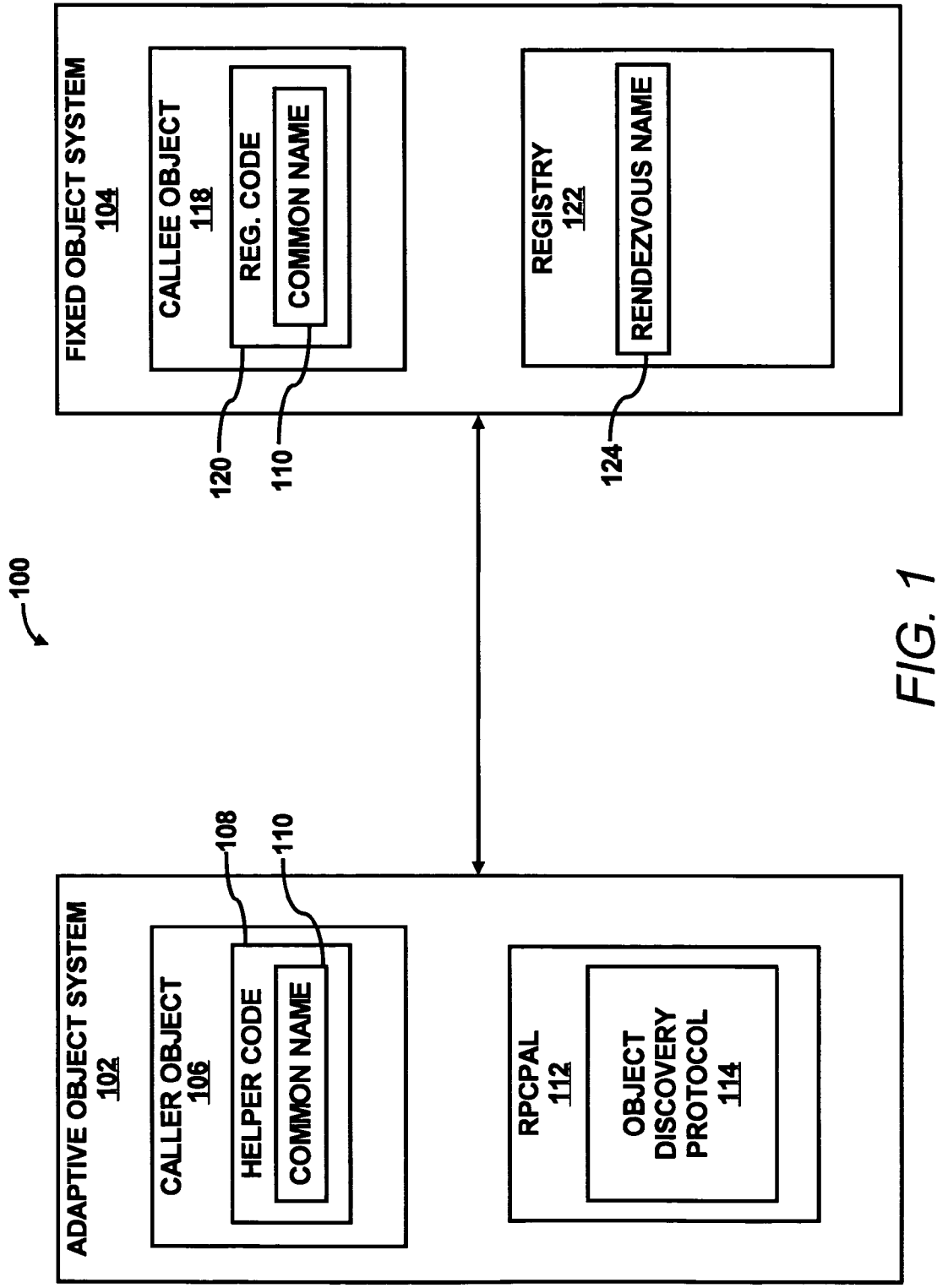
FIG. 1 shows a schematic diagram of an object discovery system containing an adaptive object system and a fixed object system in accordance with an embodiment.

For simplicity and illustrative purposes, the principles of the invention are described by referring mainly to examples thereof. In the following description, numerous specific details are set forth in order to provide a thorough understanding of the invention. It will be apparent however, to one of ordinary skill in the art, that the invention may be practiced without limitation to these specific details. In other instances, well known methods and structures have not been described in detail so as not to unnecessarily obscure the invention.

Throughout the present disclosure, reference is made to a fixed object system. The fixed object system includes objects and a registry for registering the objects. Objects running in the fixed object system may search the registry and discover references to other objects registered in the fixed object system. Examples of fixed objects systems include CORBA, COM/DCOM, .NET, RMI/J2EE.

In addition, reference is made to an adaptive object system. The adaptive object system includes objects, a registry for registering the objects and a remote procedure call protocol abstraction layer (hereinafter referred to as "RPCPAL"). The RPCPAL allows the adaptive object system to communicate with the fixed object system. The RPCPAL is a specific mechanism for solving the general problem of enabling an object invocation to occur across two dissimilar object systems—the adaptive object system and the fixed object system.

Examples of the other such mechanisms, which are bridges, include IONA's OrbixCOMet to provide bridging between CORBA and COM, and BEA's WebLogic to support ActiveX clients to invoke CORBA objects (ActiveX makes use of COM). However, all these bridges are standalone runtime infrastructures, independent of the two object systems being bridged. As a result, object discovery from one object system to the other cannot be transparent to user applications.

The RPCPAL includes several components for allowing the adaptive object system to communicate with and perform tasks within the fixed object systems. For example, the RPCPAL includes an object discovery protocol for accepting a discovery request from an object within the adaptive object system, searching the registry of a fixed object system, and returning a reference to the discovered object within the fixed object system to the adaptive object system. Each RPCPAL instance may include one object discovery protocol that knows how to deal with a specific, available fixed object system. Multiple RPCPAL instances may be simultaneously active at runtime in order to allow the objects in the adaptive object system to simultaneously perform object discovery to multiple fixed object systems. The RPCPAL may also include an object registration protocol for accepting a registration request from an object within the adaptive object system and registering the object within the registry of the fixed object system. Similarly, multiple, simultaneous RPCPAL instances may be active. In addition, each of the simultaneous RPCPAL instances may include an object registration protocol for a particular available fixed object system. The RPCPAL is a bridge transport between the adaptive object system and a fixed object system, which allows object discovery/registry/invocation occurrences between two object systems. The RPCPAL also includes a transport registry, which maps objects between the adaptive object system and the fixed object systems.

Reference is also made to a common name and a rendezvous name. The common name is a designation given to an object by a developer of the object. The common name of the object is available to anyone wanting to use the object in a program. The rendezvous name is a designation of the object obtained by converting the common name in the object system in which the object will run. The common name is understood by the developer and other users while the rendezvous name is internal to the object system in which the object will run.

Reference is further made to a callee object and a caller object. The callee object is the object written by the developer that will be called by the caller object. The common name and the rendezvous name both refer to the callee object. The caller object is the object that will call the callee object. The caller object knows the common name of the callee object. The callee object may be located in one of the fixed object systems or in the adaptive object system. The caller object may also be located in one of the fixed object systems or in the adaptive object system. Thus, object discovery and the subsequent object invocation may occur, independent of where the callee object is located.

Reference is also made to helper code and registration code. Both the helper code and the registration code are generated from an Interface Definition Language (IDL) compiler and include the common name of the object. When the callee object is in the fixed object system, the helper code may be included in the caller object while the registration code may be included in the callee object. The helper code further includes methods for calling upon the object discovery protocol of the RPCPAL. The registration code may include methods for converting the common name to the rendezvous name and registering the callee object into the registry of the fixed object system using the rendezvous name as the registration key. The registry contains a collection of name/value pairs, in which the name is the registration key, and the value is the corresponding object reference. The registry provides an operation, whose input is the key, and the discovered object reference is returned. If the key does not exist, the discovered object reference is null. The registry may be implemented as, for instance, a link list, a hash table, etc. Alternatively, when the callee object is in the adaptive object system, the registration code for the callee object may include methods for calling upon the object registration protocol of the RPCPAL, to register the callee object into the registry of the fixed object system.

In one example, a fixed object system includes a callee object created by a developer and a registry. The developer gives the callee object a common name and uses an IDL compiler to generate helper code and registration code. The developer may, for instance, include the registration code into the build process of the fixed object system. The helper code is available to any one who may want to use the callee object from the adaptive object system. An adaptive object system includes a caller object created by the developer or another developer and the RPCPAL. The developer may include the helper code in the caller object. When the fixed object system is started, the registration code of the callee object activates, converts the common name to a rendezvous name and registers the callee object into the registry of the fixed object system, using the rendezvous name as the registration key.

When the caller object first runs, the helper code activates and issues a discovery request to an object discovery protocol within the RPCPAL. The object discovery protocol converts the common name located in the helper code to the rendezvous name and searches the registry of the fixed object system to discover a reference to the callee object, which is referred to as the fixed object reference. Once the fixed object reference returns to the RPCPAL, the RPCPAL transforms this object reference into an object reference that is native to the adaptive object system, following the object reference encoding mechanism supported by the adaptive object system. The resulting object reference is called the adaptive object reference, which is returned to the caller object.

Once the adaptive object reference is returned, the caller object may call the callee object through the RPCPAL via call-related protocols in the RPCPAL. For example, if the callee object is a factory object, then calling this callee object leads to object creation in the fixed object system, and such created objects may be returned as part of call results to the adaptive object system. Destruction of callee objects may also occur via lifecycle management related calls to the callee objects. A more detailed description of methods for call invocation between heterogeneous object systems may be found in U.S. Pat. No. 6,408,342 issued to Moore et al. This patent is assigned to the assignee of the present invention and is incorporated by reference herein in its entirety. Additionally, once the caller object has a reference to the callee object, the caller object may discover other objects in the fixed object system, by invoking the corresponding method supported by the callee object.

In another example, an adaptive object system includes a callee object created by a developer and the RPCPAL. The developer gives the callee object a common name and uses an IDL compiler to generate registration code. The developer may include the registration code of the callee object into the build process of the adaptive object system, and may publish the common name so it is available to any one who may want to use the callee object. A fixed object system includes a caller object created by the developer or another developer and a registry. The developer includes the common name in the caller object.

When the adaptive object systems starts, the callee object's registration code activates and issues a registration request to an object registration protocol within the RPCPAL. The object registration protocol creates an object reference native to the fixed object system, which is referred to herein as a fixed object reference. This fixed object reference refers to an object instance in the RPCPAL, which is created by the object registration protocol upon the registration request, and is native to the fixed object system. The object type of this object instance is fixed and generic to all the RPC instances, and therefore independent of the callee object that is under registration. Furthermore, the RPCPAL transforms this newly created object reference into an adaptive object reference, following the object reference encoding mechanism supported by the adaptive object system. This reference encoding is lossless, that is, from the resulting adaptive object reference, the fixed object reference may later be uniquely reconstructed. An example of such object reference encoding mechanism is CORBA's Interoperable Object Reference (IOR) encoding. The adaptive object reference is added to a transport registry of the RPCPAL, along with a mapping between the object reference to the callee object, which may follow the same reference encoding format as the adaptive object reference, as both are native to the adaptive object system, and this adaptive object reference. The object registration protocol converts the common name located in the registration code to the rendezvous name and registers the fixed object reference into the fixed object system, using the rendezvous name as the registration key. As a result, both the adaptive object reference in the adaptive object system and the fixed object reference in the fixed object system refer to the callee object, via the mapping knowledge available in the RPCPAL.

When the caller object runs, the caller object uses the rendezvous name derived from the common name and searches the registry to find the fixed object reference. Once the fixed object reference is known, the caller object may call the callee object. The call request will be routed to the RPCPAL, due to the location information encoded in the fixed object reference. The RPCPAL may use other call-related protocols to dispatch the incoming call to the callee object, based on the mapping knowledge in the RPCPAL. A more detailed description of methods for method invocation between heterogeneous object systems may be found in U.S. Pat. No. 6,408,342. Additionally, once the caller object has a reference to the callee object, the caller object may discover other objects in the adaptive object system through some methods provided by the callee object.

In another example, a first fixed object system includes a callee object created by a developer and a first registry. A second fixed object system includes a caller object and a second registry. The developer gives the callee object a common name and uses an IDL compiler to generate helper code, a first registration code for the fixed object system in which the callee object will run and a second registration code for an adaptive object system. This second registration code allows the objects in the adaptive object system to be registered into the other fixed object system's registry. The developer may include the first registration code of the callee object into the build process of the first object system. The helper code and the second registration code are available to any one who may want to use the callee object, or to become the callee object to the other fixed object system. When the first object system starts, the callee object's first registration code activates, converts the common name to a rendezvous name and registers the callee object into the first fixed object system, using the rendezvous name as the registration key.

An adaptive object system includes a server application created by the developer or another developer or automatically generated from the IDL compiler and the RPCPAL. The server application includes the helper code and the second registration code. When the server application runs, the helper code activates and issues a discovery request to an object discovery protocol within the RPCPAL. The object discovery protocol converts the common name located in the helper code to the rendezvous name and searches the first registry of the first fixed object system to discover a reference to the callee object referred to as the first fixed object reference. After the first fixed object reference is returned to the RPCPAL, it gets transformed into the adaptive object reference based on the object reference encoding mechanism supported by the adaptive object system. The adaptive object reference is kept by the server application. In addition, both the adaptive object reference and the first fixed object reference refer to the callee object, because object reference encoding is lossless, that is, the adaptive object reference is uniquely mapped to the first fixed object reference.

Additionally, when the server application runs and finishes the object discovery to the first object system, the second registration code activates and issues a registration request to an object registration protocol within the RPCPAL. The object registration protocol converts the common name located in the registration code to the rendezvous name and registers the discovered object reference (namely, the adaptive object reference that is uniquely mapped to the fixed object reference), into the registry of the second fixed object system, using the rendezvous name as the registration key. This adaptive object reference is called the first adaptive object reference. During the registration process, the object registration protocol creates a second fixed object reference native to the second object system, and encodes this second fixed object reference into an adaptive object reference, which is called the second adaptive object reference. The second adaptive object reference is then stored into the transport registry of the RPCPAL, along with the mapping between the first and second adaptive object references, so that both the second adaptive object reference and the second fixed object reference are mapped to the first adaptive object reference that further is mapped to the first fixed object reference that is the reference to the callee object. Therefore, through the chain of reference mapping, the second fixed object reference in the second fixed object system is mapped to the first fixed object reference to the callee object in the first fixed object system.

When the caller object runs, the caller object uses the rendezvous name and searches the second registry to find the second fixed object reference. Once the second fixed object reference is known, the caller object may perform calls to the callee object through the two RPCPALs: one RPCPAL is between the second fixed object system and the adaptive object system, and the other RPCPAL is between the adaptive object system and the first object system. A more detailed description of methods for call invocation between heterogeneous object systems may be found in U.S. Pat. No. 6,408,342. Additionally, once the caller object has a reference to the callee object, the caller object may discover other objects via the methods provided by the callee object.

Through implementation of various examples disclosed herein, object discovery in heterogeneous systems may be achieved without suffering from some of the drawbacks associated with known object discovery systems. For instance, the object discovery systems of the present invention do not require the creation of specific interface application level proxies. Instead, in the object discovery systems, the proxies are generic and maintained by each RPCPAL. In addition, an administrative tool is not required for registration because the IDL definitions have been extended with a common name that may be used to auto-register the desired targets across the heterogeneous object systems.

As another example, the object discovery systems of the present invention do not require the use of specialized opcodes for a Java virtual machine. Various approaches disclosed in the present invention may instead bridge above the virtual machine layer. In addition, multiple simultaneous bridges (i.e., RPCPALs) may exist across multiple fixed object systems as opposed to support of only a single fixed object system.

With reference first to FIG. 1, there is shown a schematic diagram of a heterogeneous object system 100 having an adaptive object system 102 and a fixed object system 104. The adaptive object system 102 includes a caller object 106 having helper code 108 including a common name 110. The adaptive object system 102 also includes a RPCPAL 112 having an object discovery protocol 114. The fixed object system 104 includes a callee object 118 having registration code 120 including the common name 110. The fixed object system 104 also includes a registry 122 with a rendezvous name 124 of the callee object 118 registered therein.

Figure 2:
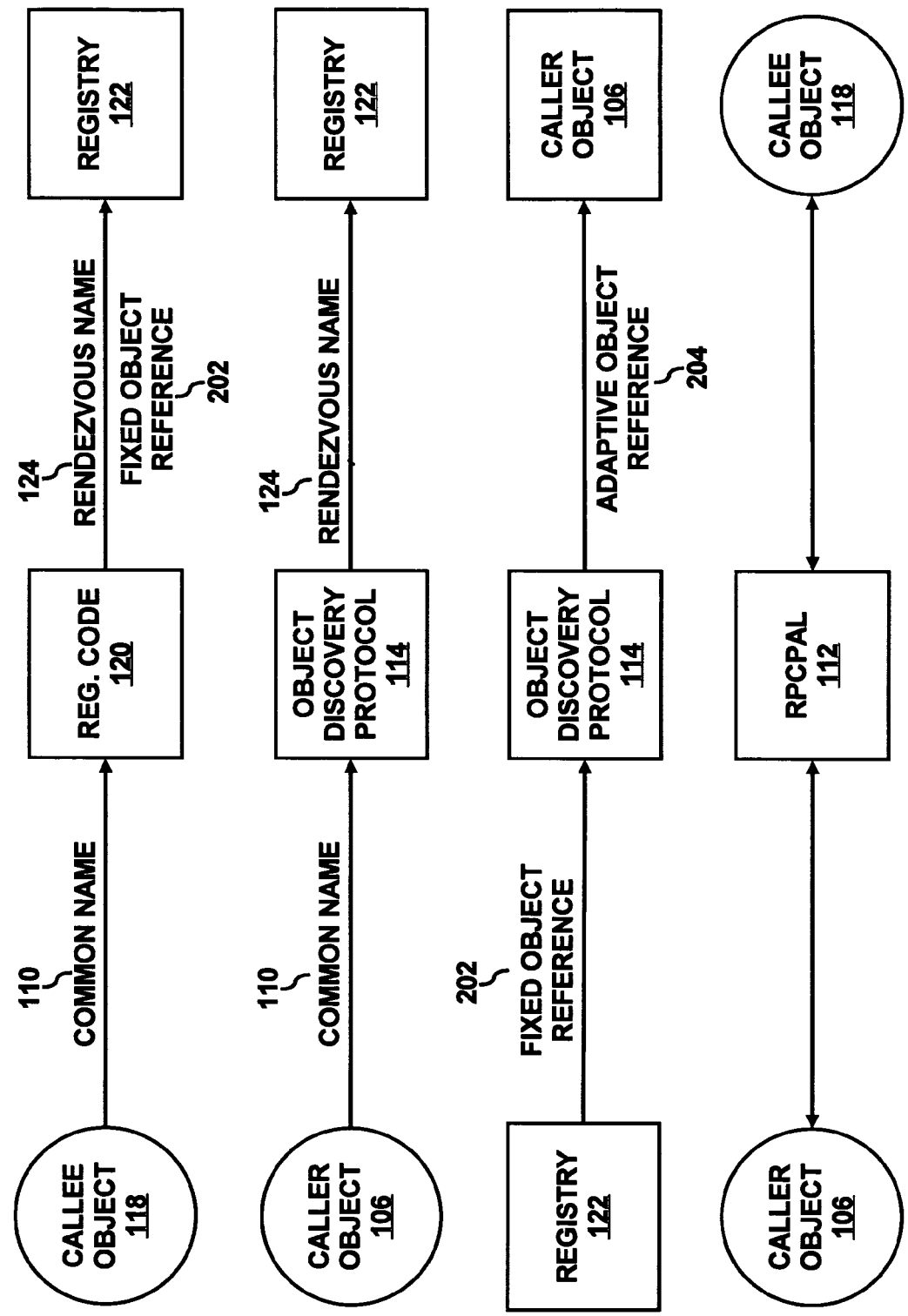
FIG. 2 shows an illustration of the system components' interaction in accordance with an example of the object discovery system illustrated in FIG. 1.

FIG. 2 shows an illustration of the system components' interaction in accordance with an example of the heterogeneous object system illustrated in FIG. 1. The callee object 118 uses the common name 110 and the registration code 120 to obtain the rendezvous name 124, which becomes the registration key in the registry 122 for a fixed object reference 202 referring to the callee object 118. The fixed object reference 202 is viewed as the local name of the callee object 118 in the fixed object system 104, in contrast to the common name, which is global to both the fixed object system and the adaptive object system, because it is locally meaningful to the fixed object system 104, as well as the RPCPAL 112 that is designated to this fixed object system 104. The RPCPAL 112 may be considered as the extension of the adaptive object system 102 to be attached to the fixed object system 104.

The caller object 106 uses the common name 110 contained in the helper code 108 to issue a discovery request to the object discovery protocol 114. The discovery request includes the common name 110, which is converted to the rendezvous name 124 in the object discovery protocol 114. The object discovery protocol 114 uses the rendezvous name 124 to search the registry 122 in the fixed object system 104. The uncovered fixed object reference is encoded into an adaptive object reference 204 by the RPCPAL, and this adaptive object reference 204 is returned to the caller object 106.

The adaptive object reference 204 and the fixed object reference 202 both refer to the callee object 118, because the object reference encoding from the fixed object reference 202 to the adaptive object reference 204 is lossless. The caller object 106 is now able to perform calls to the callee object 118 through the RPCPAL 112, and may include other objects' instantiation from a method provided by the callee object 118, and destruction of the callee object 118 from a method provided by the callee object 118.

Figure 3:
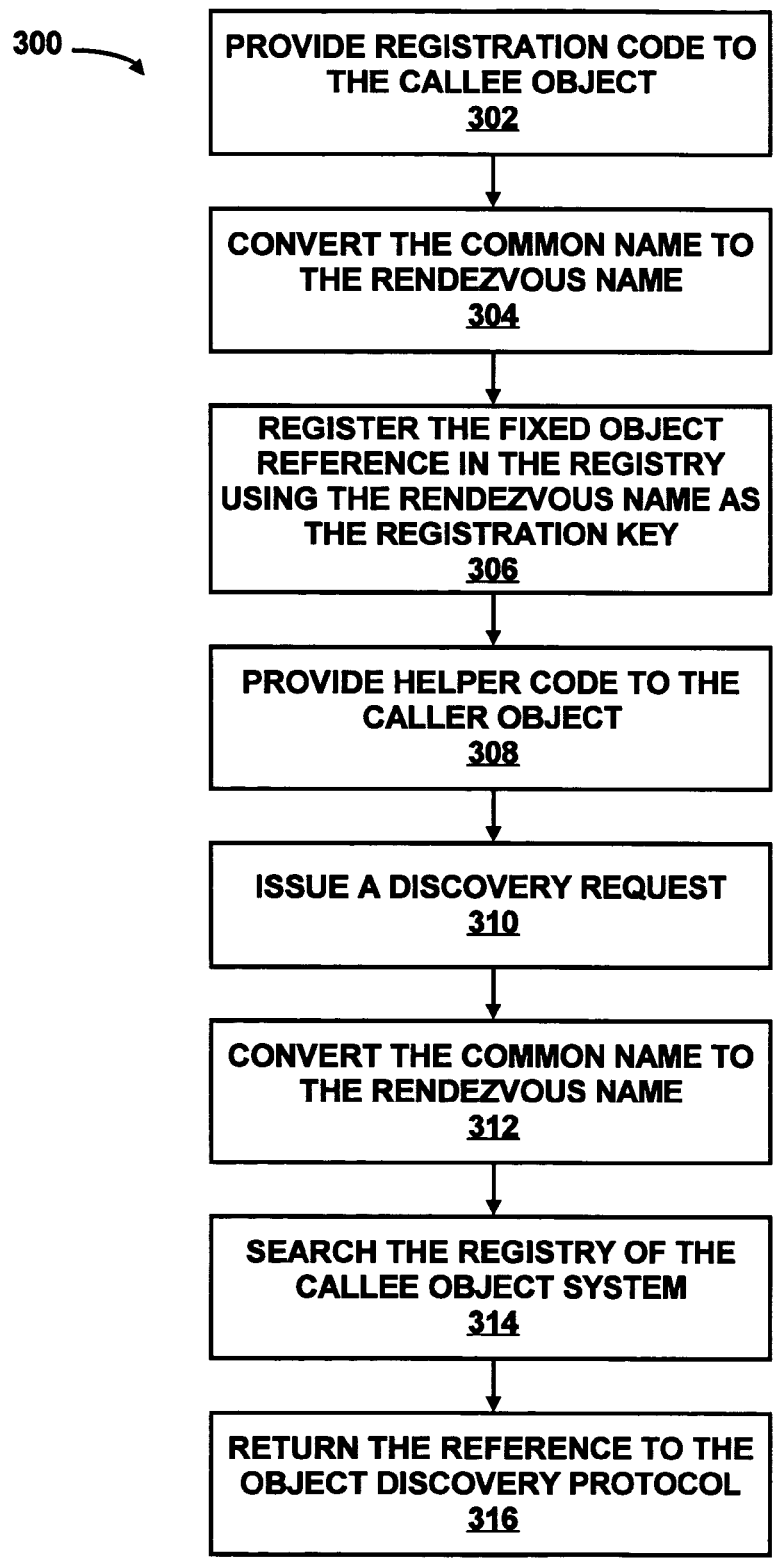
FIG. 3 shows a flow diagram of a method for discovering an object in accordance with an example of the object discovery system illustrated in FIG. 1.

FIG. 3 shows a flow diagram of a method 300 for discovering an object in accordance with an example of the heterogeneous object system illustrated in FIG. 1. The following description of the method 300 is made with reference to the FIGS. 1 and 2, and thus makes reference to the elements cited therein. The following description of the method 300 is one manner in which objects may be discovered in heterogeneous object systems. In this respect, it is to be understood that the following description of the method 300 is but one manner of a variety of different manners in which objects may be discovered in heterogeneous object systems.

In the method 300, the registration code 120 is provided to the callee object 118 at step 302. The registration code 120 includes the common name 110 of the callee object 118 and converts the common name 110 to the rendezvous name 124 at step 304. The registration code 120 registers the fixed object reference 202 in the registry 122 at step 306, using the rendezvous name 124 as the registration key.

The helper code 108 is provided to the caller object 106 at step 308. The helper code 108 includes the common name 110 of the callee object 118 and issues a discovery request to the object discovery protocol 114 at step 310. The object discovery protocol 114 converts the common name 110 to the rendezvous name 124 at step 312. The object discovery protocol 114 then searches the registry 122 of the fixed object system 104 using the rendezvous name 124 at step 314. The fixed object reference 202 is returned to the object discovery protocol 114 at step 316. Also at step 316, the object discovery protocol 114 transforms the fixed object reference 202 into the adaptive object reference 204. The adaptive object reference 204 subsequently is returned to the caller object 106.

Some of the steps illustrated in the method 300 may be carried out in a different manner than the manner described above. For instance, the caller object 106 may simultaneously load a plurality of RPCPALs 112. Each of the RPCPALs 112 may include object discovery protocols 114 configured to communicate with a different fixed object system 104. In this instance, the object discovery protocol 114 may fail to find an entry for the rendezvous name 124 in the registry 122 of the fixed object system 104. Therefore, the next object discovery protocol 114 in a different RPCPAL 112 in the list may search the registry of the next fixed object system and so forth until an entry in the registry is discovered.

Figure 4:
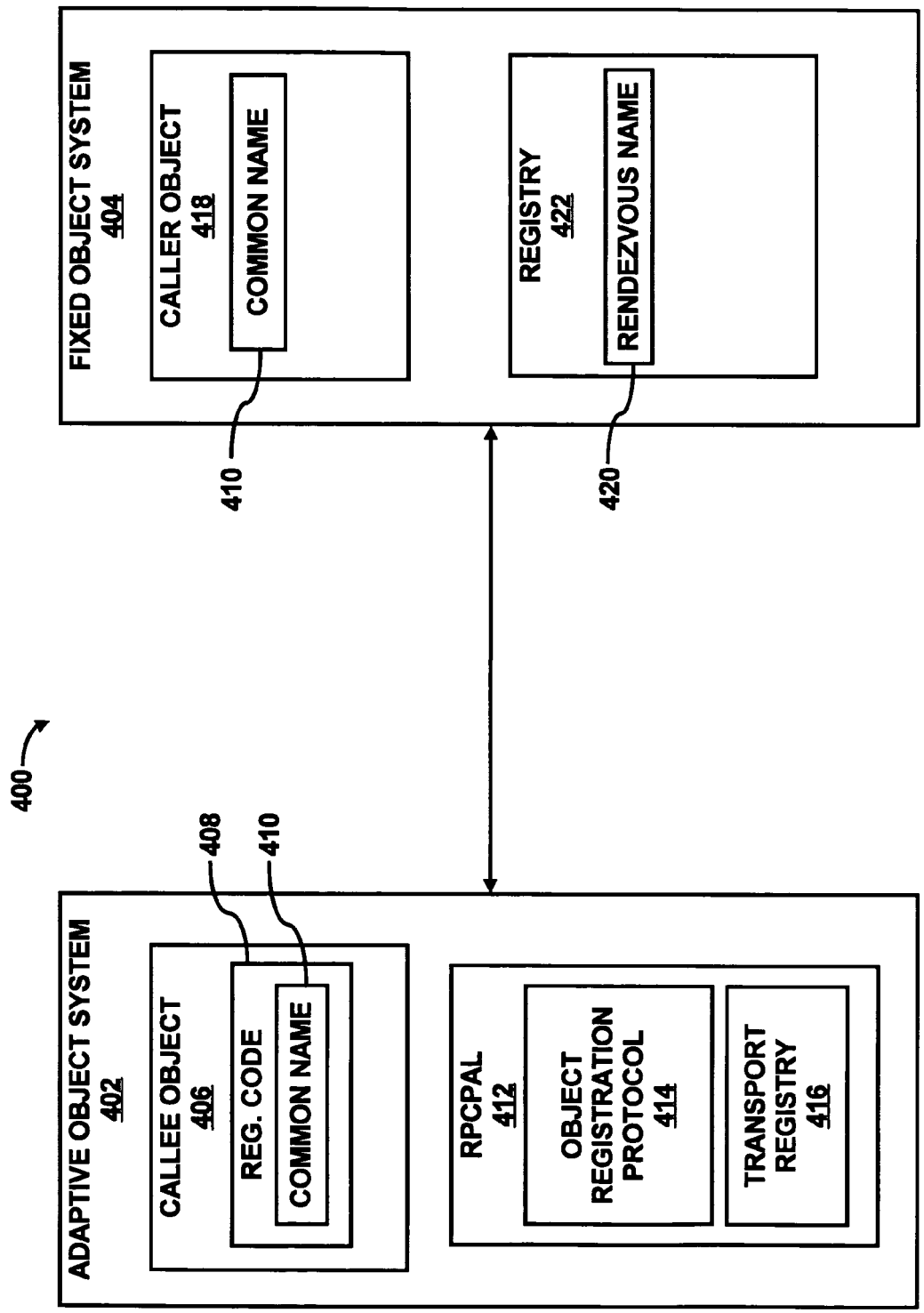
FIG. 4 shows a schematic diagram of an object discovery system containing an adaptive object system and a fixed object system in accordance with another embodiment.

Referring now to FIG. 4, there is shown a schematic diagram of a heterogeneous object system 400 having an adaptive object system 402 and a fixed object system 404 in accordance with another example. The adaptive object system 402 includes a callee object 406 having a registration code 408 including a common name 410. The adaptive object system 402 also includes a RPCPAL 412 having an object registration protocol 414 and a transport registry 416. The fixed object system 404 includes a caller object 418 having a common name 410 of the callee object 406. The fixed object system 404 also includes a registry 422 with the rendezvous name 420 of the callee object 406 registered therein, which may be included after the object registration protocol is performed.

The transport registry 416 includes a table that maintains a one-to-one mapping between the callee object's 406 object reference, and an adaptive object reference which encodes a fixed object reference 504 (FIG. 5A) of the fixed object system 404, following the object reference encoding mechanism supported in the adaptive object system 402.

Figure 5A:
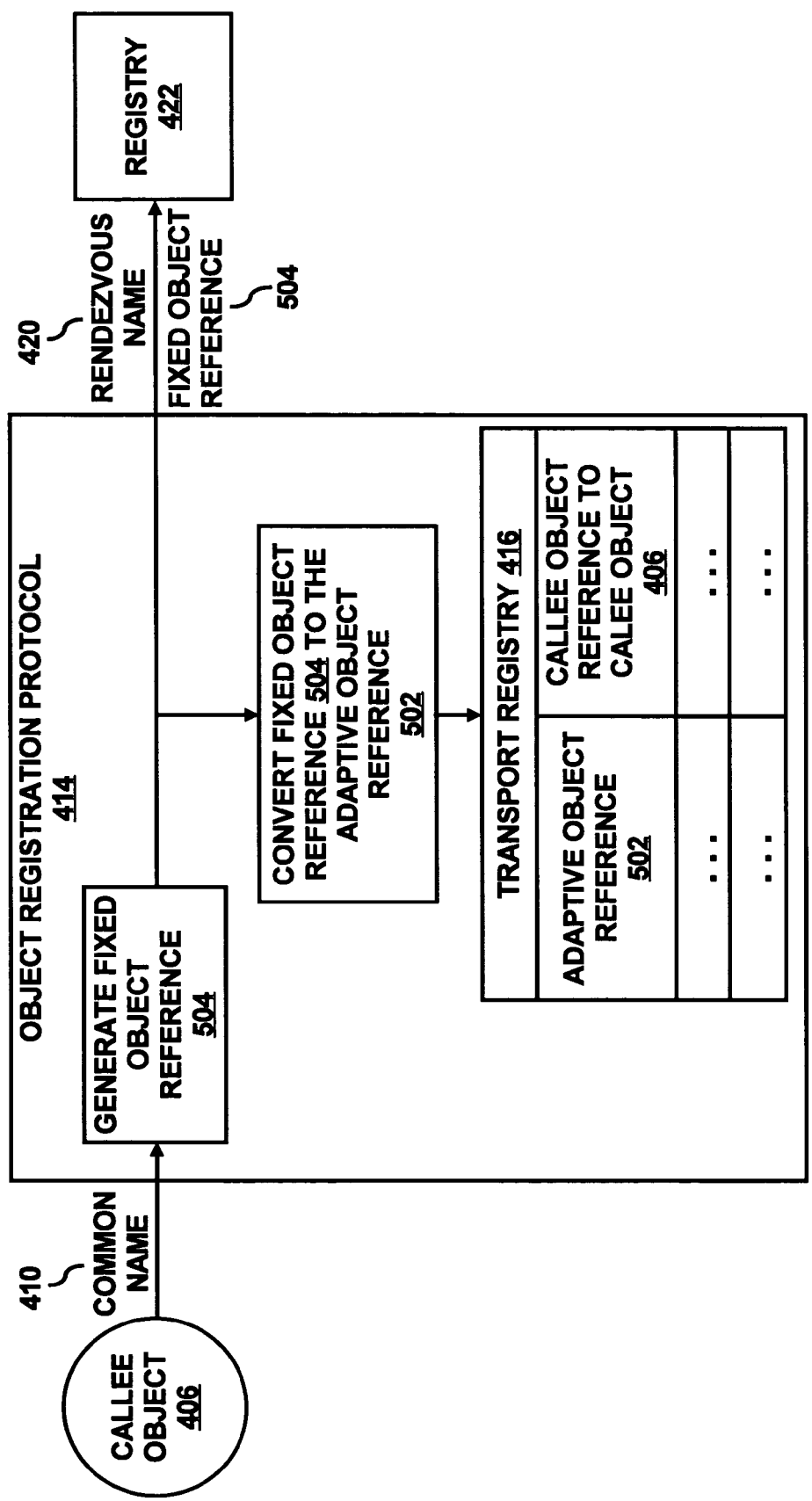
FIGS. 5A and 5B, collectively, show an illustration of the system components' interaction in accordance with an example of the object discovery system illustrated in FIG. 4.
Figure 5B:
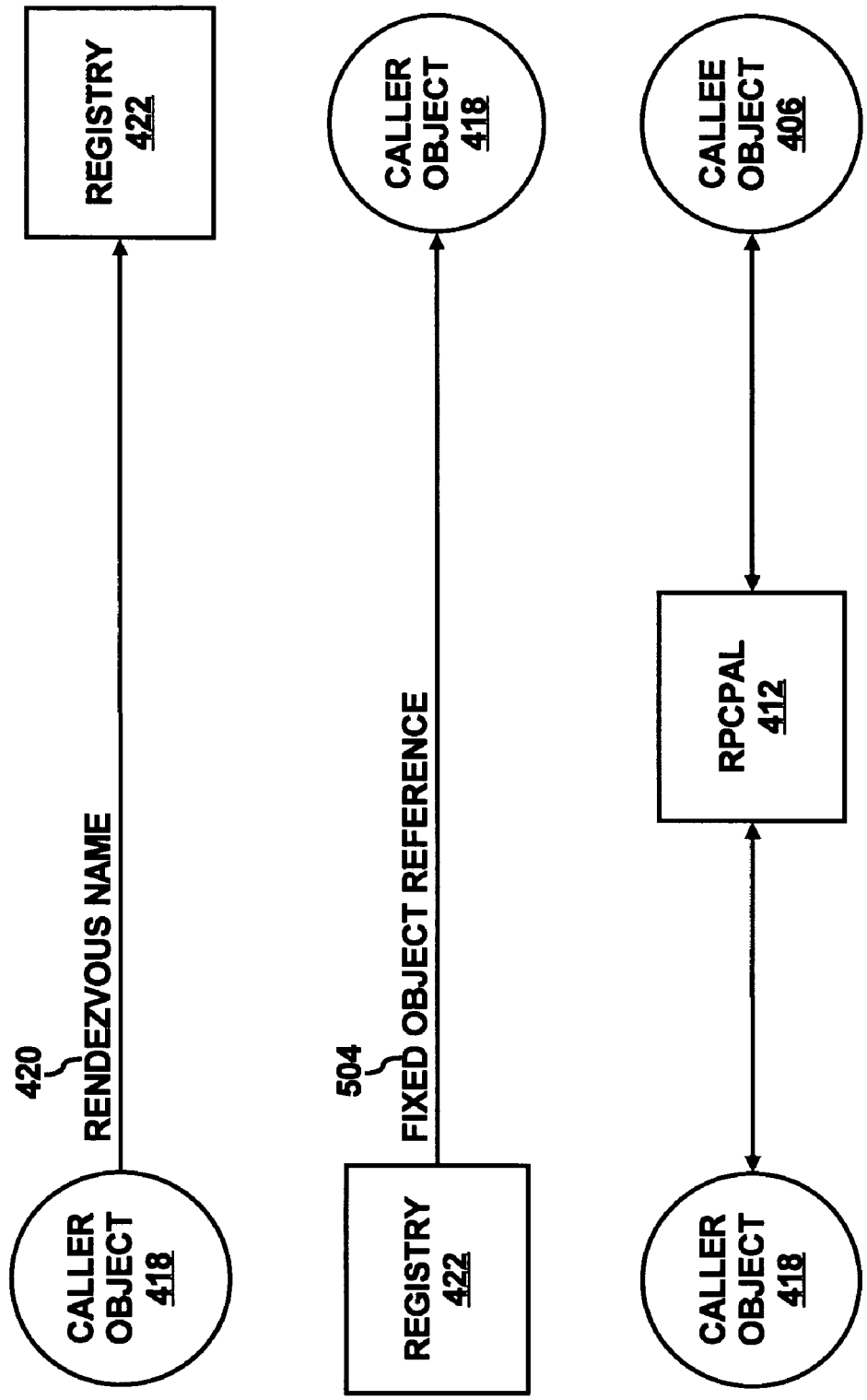

FIGS. 5A and 5B, collectively, show an illustration of the system components' interaction in accordance with an example of the heterogeneous object system illustrated in FIG. 4. As shown in FIGS. 5A and 5B, the callee object 406 uses the common name 410 and the registration code 408 to issue a registry request to the object registration protocol 414, which converts the common name 410 to the rendezvous name 420. The object registration protocol 414 also creates a fixed object reference 504, converts the fixed object reference 504 into an adaptive object reference 502, and stores the adaptive object reference 502 in the transport registry 416, along with the association between the adaptive object reference 502 and the object reference to the callee object 406. Both the adaptive object reference 502 and the object reference to the callee object 406 follow the same object reference encoding mechanism supported by the adaptive object system 402. Additionally, the object registration protocol 414 stores a fixed object reference 504 in the registry 422 of the fixed object system 404. The fixed object reference 504 is the local name of the callee object 406 in the fixed object system 404. The caller object 418 uses the common name 410 to search the registry 422 to uncover the fixed object reference 504.

The transport registry 416, at this point, has both the adaptive object reference 502 that fully encodes the fixed object reference 504, and the object reference to the callee object 406, and thus is able to map communication requests between the caller object 418 and the callee object 406. The caller object 418 is now able to perform any object related function with the callee object 406 through the RPCPAL 412.

Figure 6:
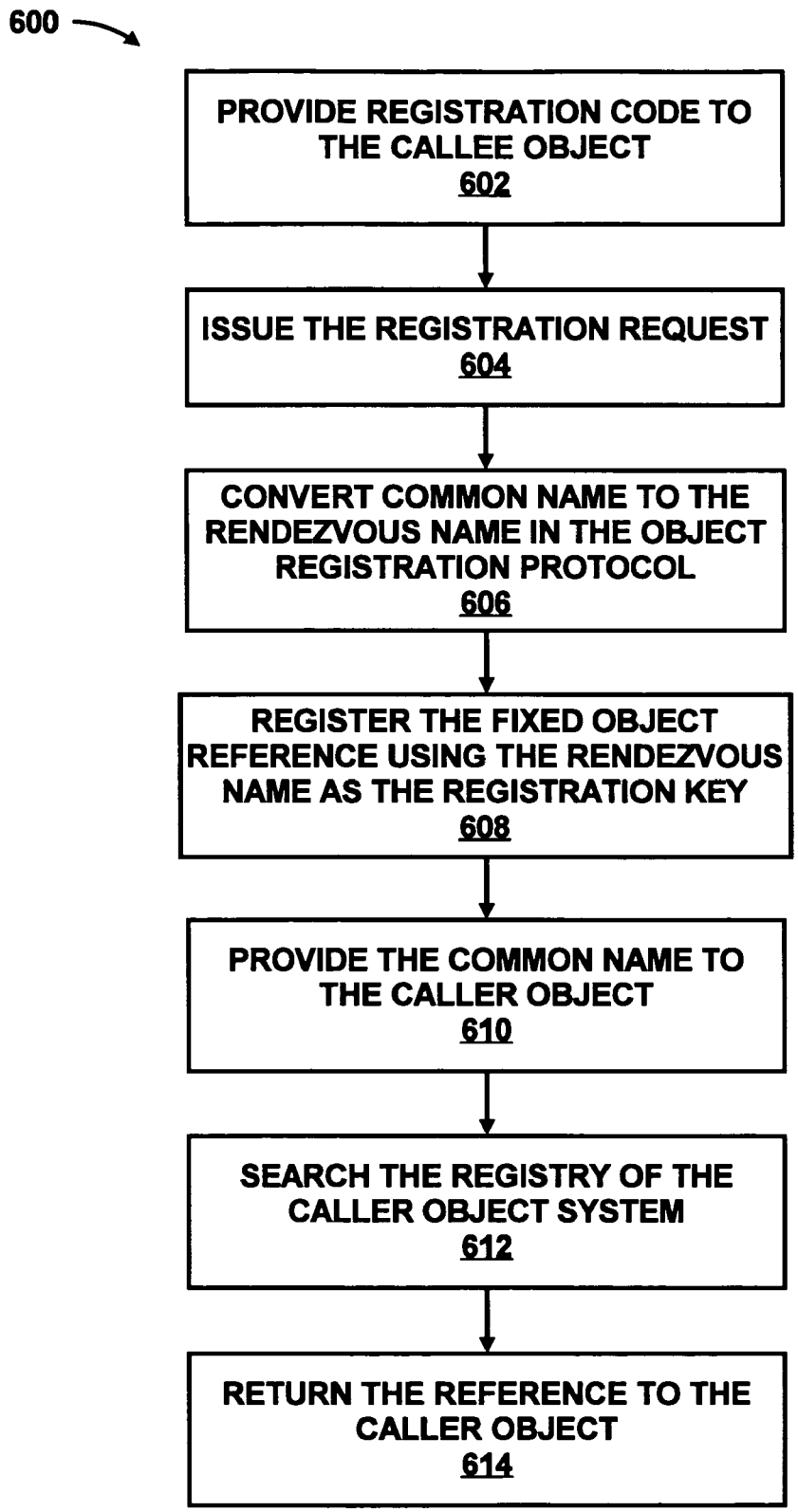
FIG. 6 shows a flow diagram of a method for discovering an object in accordance with an example of the object discovery system illustrated in FIG. 4.

FIG. 6 shows a flow diagram of a method 600 for discovering an object in accordance with an example of the heterogeneous object system illustrated in FIG. 4. The following description of the method 600 is made with reference to FIGS. 4, 5A, and 5B, and thus makes reference to the elements cited therein. The following description of the method 600 is one manner in which objects may be discovered in heterogeneous object systems. In this respect, it is to be understood that the following description of the method 600 is but one manner of a variety of different manners in which objects may be discovered in heterogeneous object systems.

In the method 600, the registration code 408 is provided to the callee object 406 at step 602. The registration code 408 includes the common name 410 of the callee object 406 and issues a registration request to the object registration protocol 414 at step 604. The object registration protocol 414 converts the common name 410 to the rendezvous name 420 and generates the fixed object reference 504 at step 606. The fixed object reference 504 is encoded as an adaptive object reference 502, and stored in the transport registry 416, along with the one-to-one association relationship to the callee object 406.

The object registration protocol 414 then registers the rendezvous name 420 and the fixed object reference 504 in the registry 422 of the fixed object system 404 at step 608. The common name 410 is provided to the caller object 418 at step 610. The caller object 418 searches the registry 422 using the rendezvous name 420 derived from the common name 410 at step 612. In addition, the fixed object reference 504 is returned to the caller object 418 at step 614.

Some of the steps illustrated in the method 600 may be carried out in a different manner than the manner described above. For instance, the callee object 406 may load a plurality of RPCPALs 412. Each of the RPCPALs 412 may provide registration protocols 414, each of which is configured to communicate with a different fixed object system 404. In this instance, a plurality of fixed object systems 404 may have the fixed object reference 504 in their registries 422, with the registration key being the rendezvous name 420. In each of these fixed object systems 404, the rendezvous name 402 may be different. The fixed object reference 504 is the local name of the callee object 406 in the corresponding fixed object system 404.

Figure 7:
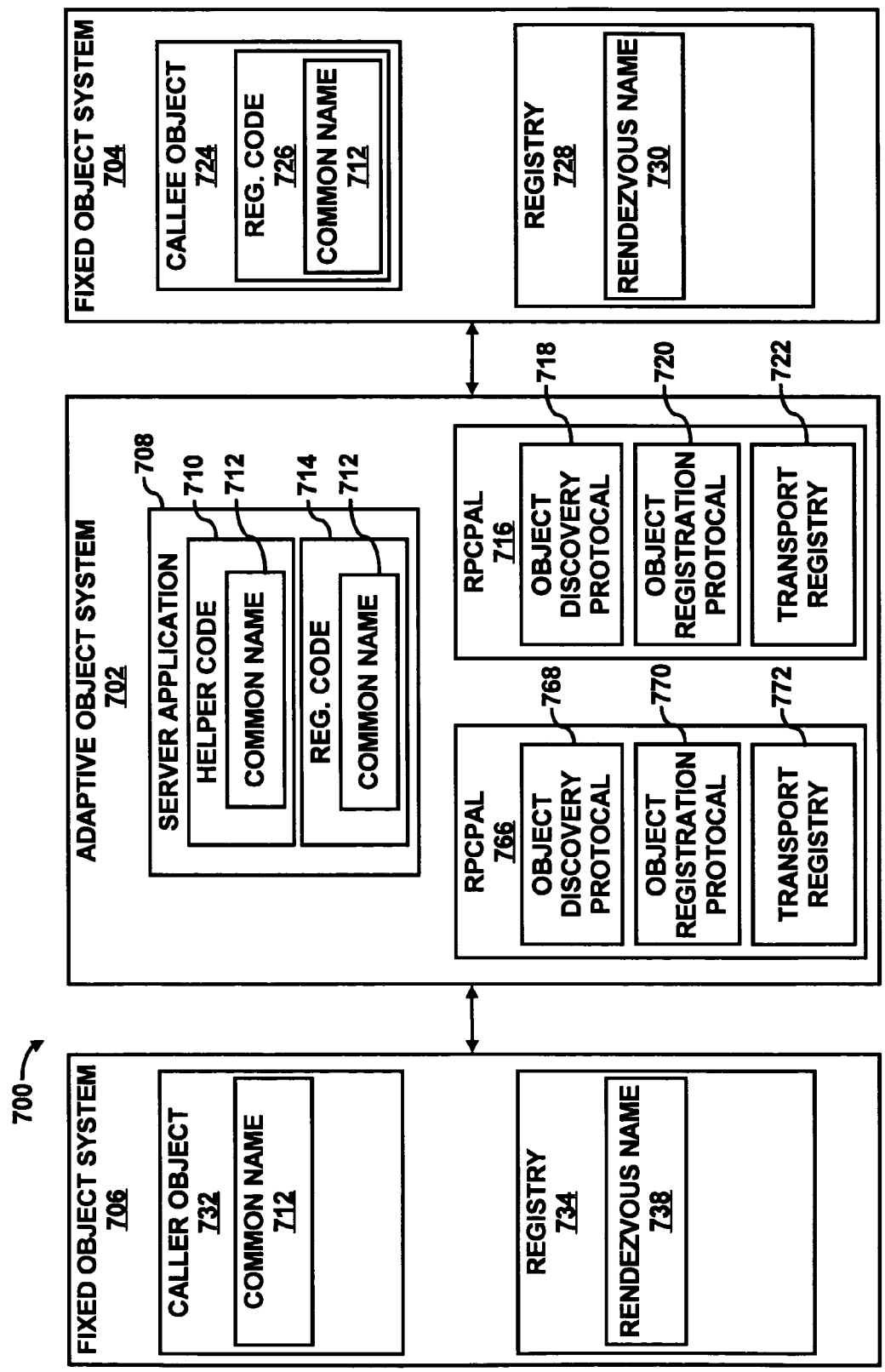
FIG. 7 shows a schematic diagram of an object discovery system having an adaptive object system and two fixed object systems in accordance with another embodiment.

Referring now to FIG. 7, there is shown a schematic diagram of a heterogeneous object system 700 having an adaptive object system 702, a first fixed object system 704 and a second fixed object system 706. The adaptive object system 702 includes a server application 708 having helper code 710 and a registration code 714. The server application 708 may be generated by the IDL compiler. Both the helper code 710 and the registration code 714 of the server application 708 include a common name 712. The adaptive object system 702 also includes a RPCPAL 716 having an object discovery protocol 718, an object registration protocol 720 and a transport registry 722. The RPCPAL 716 generally facilitates the bi-directional communication between the fixed object system 704 and the adaptive object system 702. The adaptive object system 702 further includes a RPCPAL 766 having an object discovery protocol 768, an object registration protocol 770 and a transport registry 772. The RPCPAL 766 facilitates the bi-directional communication between the fixed object system 706 and the adaptive object system 702.

The first fixed object system 704 includes a callee object 724 having registration code 726, which includes the common name 712. The first fixed object system 704 also includes a registry 728 with the callee object 724 registered using a rendezvous name 730 as the registration key therein. The second fixed object system 706 includes a caller object 732 having a common name 712 of the callee object 724. The second fixed object system 706 also includes a registry 734 with the rendezvous name 738 of the callee object 724 registered therein, after the adaptive object system 702 has finished the object registration of the callee object 724 into the registry 734. The rendezvous name 738 and the rendezvous name 730 may be different, depending on the naming schemes adopted in the two fixed object systems 704 and 706.

Figure 8A:
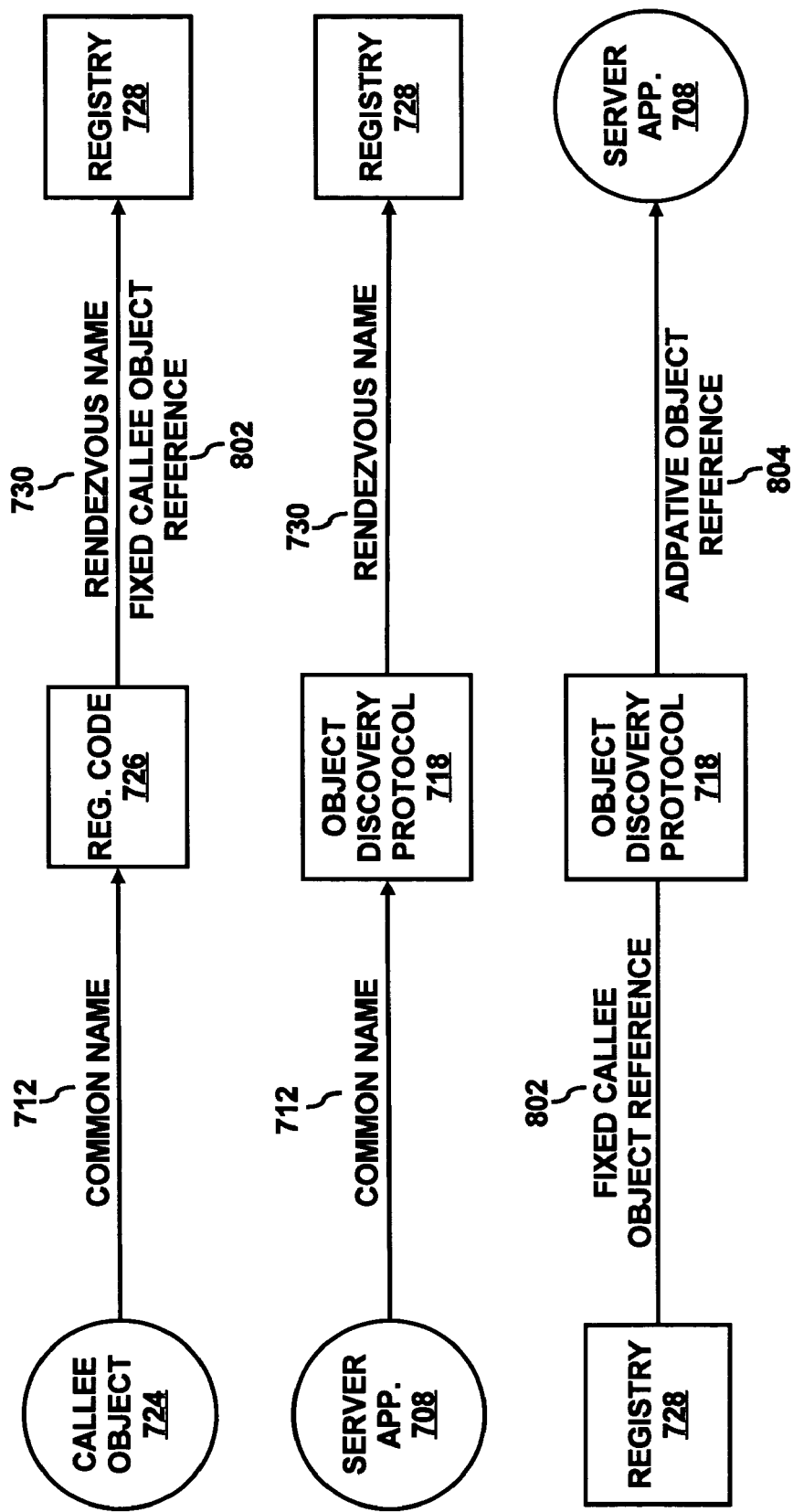
FIGS. 8A and 8B, collectively, show an illustration of the system components' interaction in accordance with an example of the object discovery system illustrated in FIG. 7.
Figure 8B:
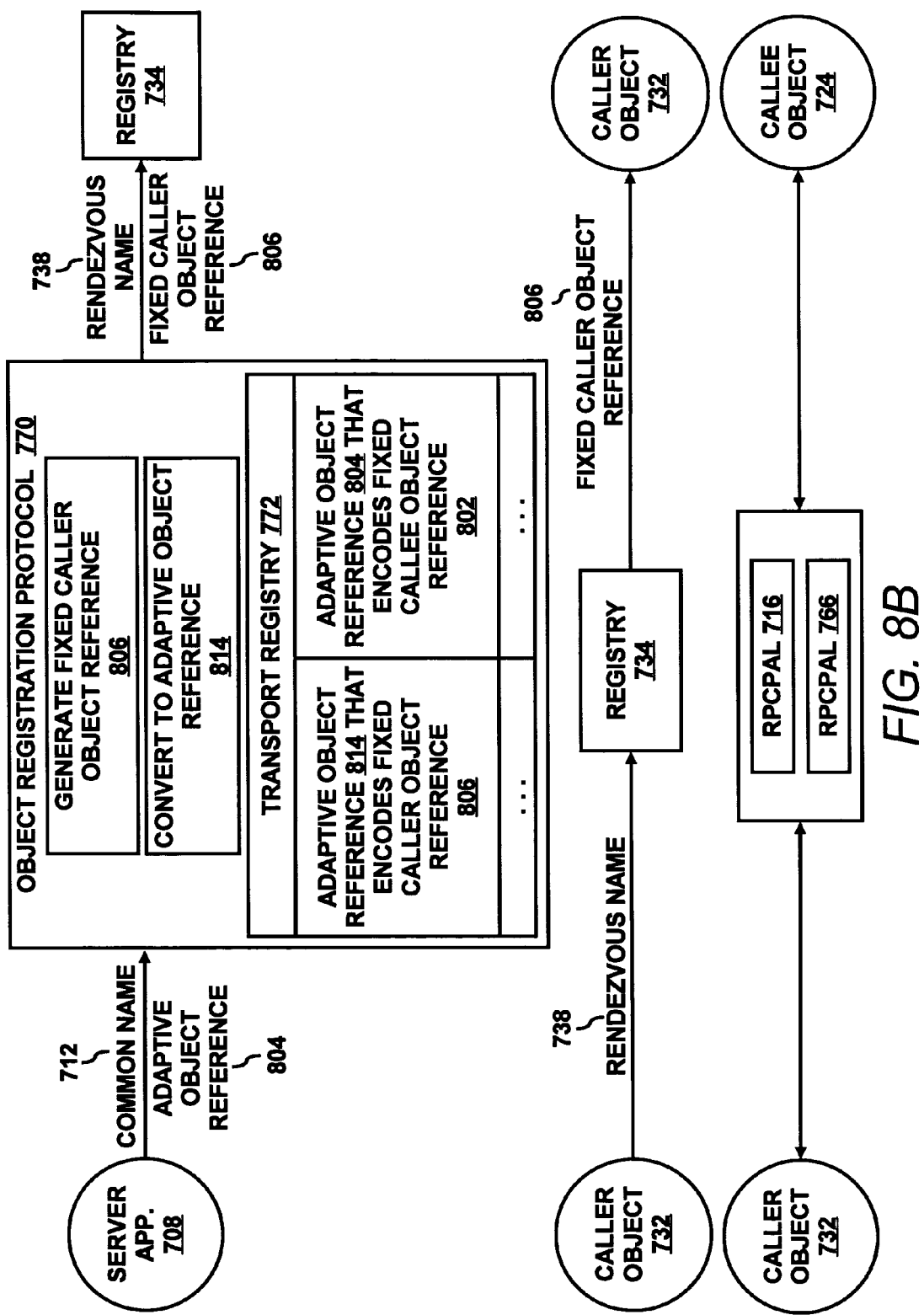

FIGS. 8A and 8B, collectively, show an illustration of the system components' interaction in accordance with an example of the object discovery system 700 illustrated in FIG. 7. As shown in FIGS. 8A and 8B, the callee object 724 uses the common name 712 and the registration code 726 to obtain the rendezvous name 730. A fixed callee object reference 802 referring to the callee object 724 is registered in the registry 728 using the rendezvous name 730 as the registration key. The fixed object reference 802 is meaningful in the fixed object system 704, and therefore is viewed as the local name of the callee object 724 in the fixed object system 704.

The server application 708 uses the helper code 710 to issue a discovery request to the object discovery protocol 718. The discovery request includes the common name 712, which is converted to the rendezvous name 730 in the object discovery protocol 718. The object discovery protocol 718 uses the rendezvous name 730 to search the registry 728 in the fixed object system 704. The search may uncover the fixed callee object reference 802 and encode it to an adaptive object reference 804 following the object reference encoding mechanism in the adaptive object system, and return the adaptive object reference 804 to the server application 708. The adaptive object reference 804 is meaningful to the adaptive object system 702, and can be viewed as the local name in the adaptive object system 702 to the callee object 724.

As shown in FIG. 8B, once the callee object 724 is discovered by the server application 708, the server application 708 also uses the common name 712 and the registration code 714 to issue a registry request to the object registration protocol 770 which converts the common name 712 to the rendezvous name 738. The object registration protocol 770 generates and stores the fixed caller object reference 806 in the registry 734. The object registration protocol 770 also stores the adaptive object reference 814 corresponding to the fixed caller object reference 806 in the transport registry 722, along with a one-to-one mapping relationship to the adaptive object reference 804. The fixed caller object reference 806 is the local name of the callee object 724 in the fixed object system 706. The caller object 732 uses the rendezvous name 738 derived from the common name 712 to search the registry 734 to uncover the fixed caller object reference 806.

The transport registry 722, at this point, has the adaptive object reference 804, and the adaptive object reference 814. Communication requests are mapped between the caller object 732 and the callee object 724 from end to end through the RPCPAL 766 and RPCPAL 716. When the caller object 732 makes a call to the fixed caller object 806, the call will be routed to the RPCPAL 766. The RPCPAL 766 will dispatch the incoming communication requests to the adaptive object reference 804 held by the server application 708, with the mapping between the adaptive object references 804 and 814. The server application 708 then further automatically delegates the communication request to the callee object 724 through the RPCPAL 716. Thus, through the adaptive object system 702 and the two RPCPALs 766 and 716, the caller object 732 is now able to perform an object related function with the callee object 724.

Figure 9:
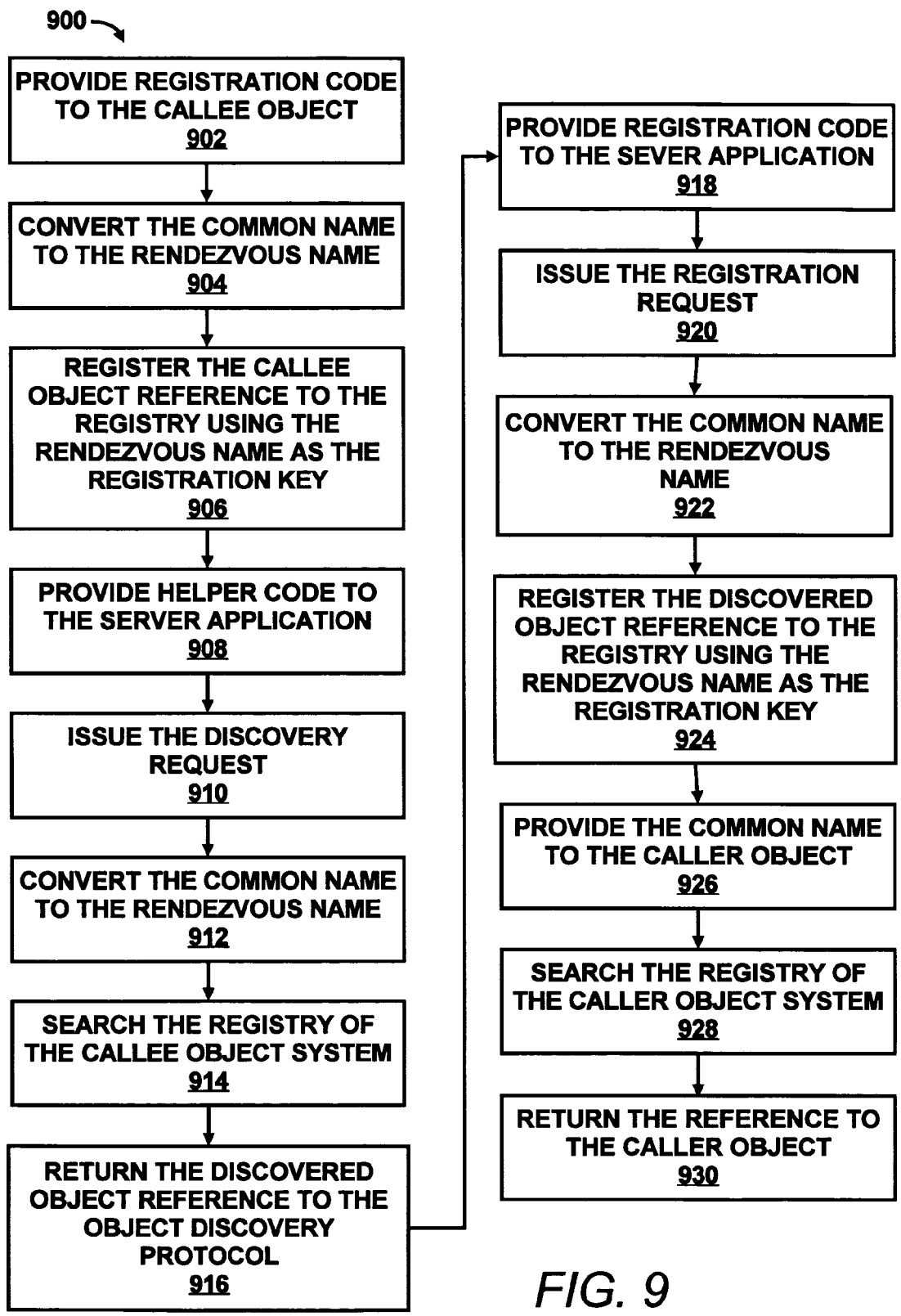
FIG. 9 shows a flow diagram of a method for discovering an object in accordance with an example of the object discovery system illustrated in FIG. 7.

FIG. 9 shows a flow diagram of a method 900 for discovering an object in accordance with an example of the object discovery system illustrated in FIG. 7. The following description of the method 900 is made with reference to the FIGS. 7, 8A, and 8B, and thus makes reference to the elements cited therein. The following description of the method 900 is one manner in which objects may be discovered in heterogeneous object systems. In this respect, it is to be understood that the following description of the method 900 is but one manner of a variety of different manners in which objects may be discovered in heterogeneous object systems.

In the method 900, the registration code 726 is provided to the callee object 724 at step 902. The registration code 726 includes the common name 712 of the callee object 724 and converts the common name 712 to the rendezvous name 730 at step 904. The registration code 726 registers the fixed callee object reference 802 in the registry 728 of the first fixed object system 704 at step 906, using the rendezvous name 730 as the registration key.

The helper code 710 is provided to the server application 708 of the adaptive object system 702 at step 908. The helper code 710 includes the common name 712 of the callee object 724 and issues a discovery request to the object discovery protocol 718 at step 910. The object discovery protocol 718 converts the common name 712 to the rendezvous name 730 at step 912. The object discovery protocol 718 then searches the registry 728 of the callee object system 704 using the rendezvous name 730 at step 914. The fixed callee object reference 802 is returned to the object discovery protocol 718, at step 916. The object discovery protocol 718 further encodes the fixed object reference 802 into the adaptive object reference 804 and returns the adaptive object reference 804 to the server application 708.

The registration code 714 is provided to the server application 708 at step 918. The registration code 714 includes the common name 712 of the callee object 724 and issues a registration request to the object registration protocol 770 at step 920. The object registration protocol 770 converts the common name 712 to the rendezvous name 738 and generates the fixed object reference 806 at step 922. The fixed object reference 806 is also encoded as the adaptive object reference 814, which is stored in the transport registry 772, along with the one-to-one mapping between the adaptive object reference 814 and the adaptive object reference 804. At this point, the transport registry 772 of the RPCPAL 766 includes the adaptive object reference 804 which is uniquely mapped to the fixed callee object reference 802, and the adaptive object reference 814 which is uniquely mapped to the fixed caller object reference 806. Thus, the adaptive object system 702 holds the end-to-end object reference mapping between the fixed object callee object reference 802 and the fixed caller object reference 806.

The object registration protocol 770 then registers the fixed caller object reference 806 in the registry 734 of the fixed object system 706 at step 924, using the rendezvous name 738 as the registration key. The common name 712 is provided to the caller object 732 at step 926. The caller object 732 searches the registry 734 using the rendezvous name 738 derived from the common name 712 at step 928. The fixed caller object reference 806 is returned to the caller object 732 at step 930.

Some of the steps illustrated in the method 900 may be carried out in a different manner than the manner described above. For instance, the server application 708 may include object discovery protocols in addition to the object discovery protocols 718 and 770. Each of the object discovery protocols may be configured to communicate with a different fixed object system. In this instance, the object discovery protocol 718 may fail to find an entry for the rendezvous name 730 in the registry 728 of the fixed object system 704. Therefore, the next object discovery protocol in the list would search the registry of the next fixed object system and so forth until an entry in the registry is discovered. Additionally, the server application 708 may include a plurality of object registration protocols other than object registration protocols 720 and 770. Each of the object registration protocols may be configured to communicate with a different fixed object system 704, 706. In this instance, a plurality of fixed object systems may receive the rendezvous name 738 and the fixed caller object reference 806 in their registries.

Figure 10:
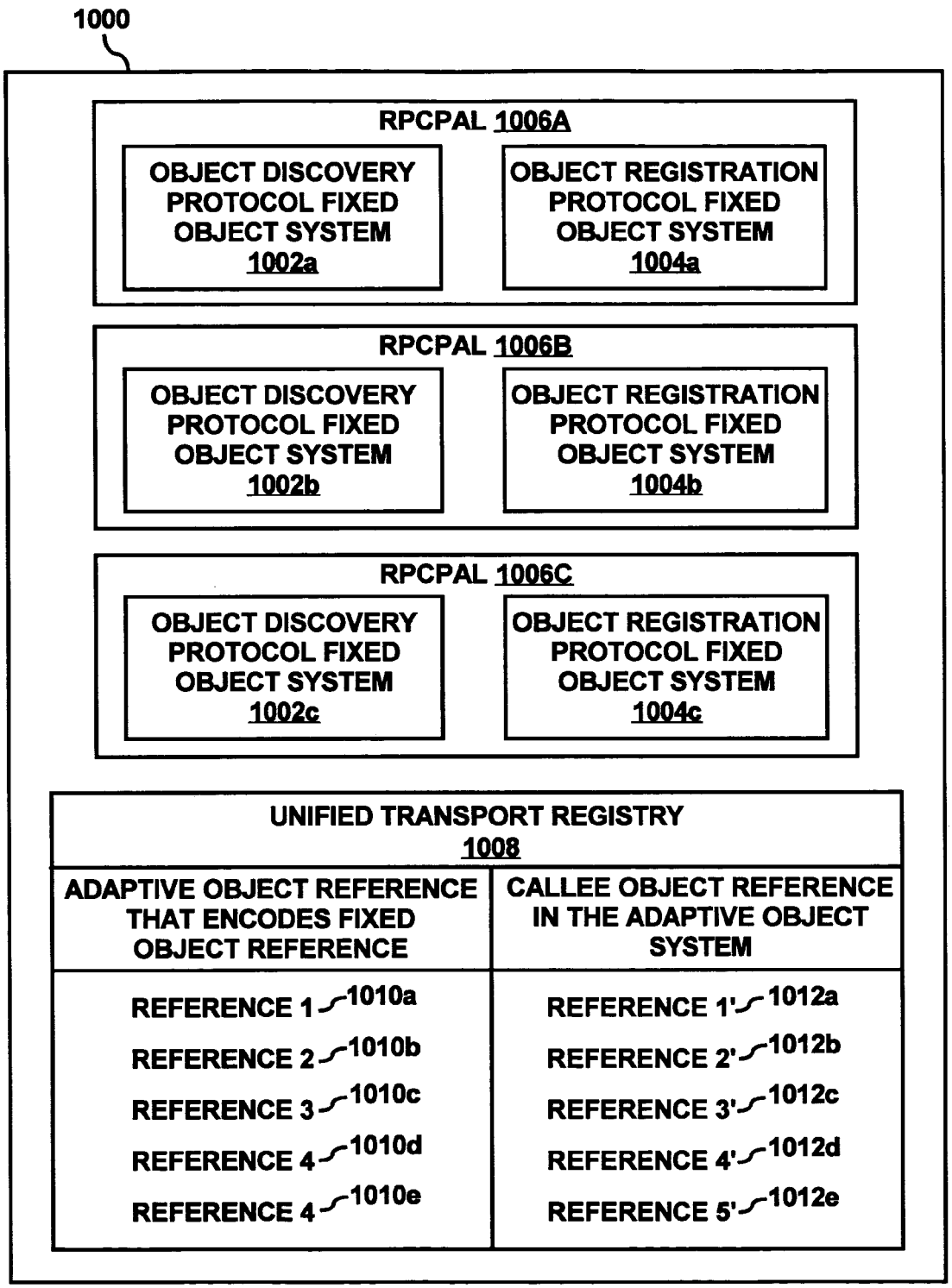
FIG. 10 shows a schematic diagram of a bridge containing multiple and simultaneous instances of the remote procedure call protocol abstraction layer of an object discovery system according to an embodiment.

Referring now to FIG. 10, there is shown a schematic diagram of a bridge 1000 that includes multiple remote procedure call protocol abstraction layer instances that are simultaneously loaded into an object discovery system. As shown, the bridge 1000 includes object discovery protocols 1002a-1002c and object registration protocols 1004a-1004c, which are contained correspondingly in respective RPCPALs 1006A-1006C, and a unified transport registry 1008. The object discovery protocol 1002a in the RPCPAL 1006A is configured to communicate with a particular type of fixed object system. The object discovery protocol 1002b in the RPCPAL 1006B is configured to communicate with a different type of fixed object system. While the object discovery protocol 1002c in the RPCPAL 1006C is configured to communicate with yet another type of fixed object system. The same arrangement exists for the object registration protocols 1004a-1004c such that there is one object discovery protocol 1002, one object registration protocol 1004 in one RPCPAL 1006 for each fixed object system needed by the adaptive object system.

The bridge 1000 also includes the unified transport registry 1008. The unified transport registry 1008 includes several entries and mappings from the callee object reference 1012a-1012e to the adaptive object references 1010a-1010e that encode the fixed object reference. Once an object is registered to a fixed object system, the generated object system references (fixed object references) are transformed into the adaptive object references 1010a-1010e. The relationship between the callee objects' object references 1012a-1012e in the adaptive object system and the adaptive object references 1010a-1010e is also maintained in the table. That is, in the unified transport registry 1008 generally operates in such a way as to map the callee object reference 1012a to the fixed object reference that is encoded in the adaptive object reference 1010a, that is, reference 1 is mapped to reference 1'. The unified transport registry 1008 is not empty if one of the object registration protocols 1004a-1004c is ever activated in the adaptive object system. In addition, the unified transport registry 1008 is not accessed by object discovery protocols 1002a-1002c.

This type of object reference mapping maintained in the unified transport registry 1008 may be used for discovery between two fixed object systems and an adaptive object system as is shown in FIG. 7, in which the transport registries 772 and 722 are distinctive and private to their respective RPCPAL 766 and RPCPAL 716. The unified transport registry 1008 is the unification of the transport registries 772 and 722. And the callee object reference stored in the unified transport registry 1008 is an adaptive object reference that is uniquely mapped to the callee object in a fixed object system, after the callee object reference is discovered in the adaptive object system.

Figure 11:
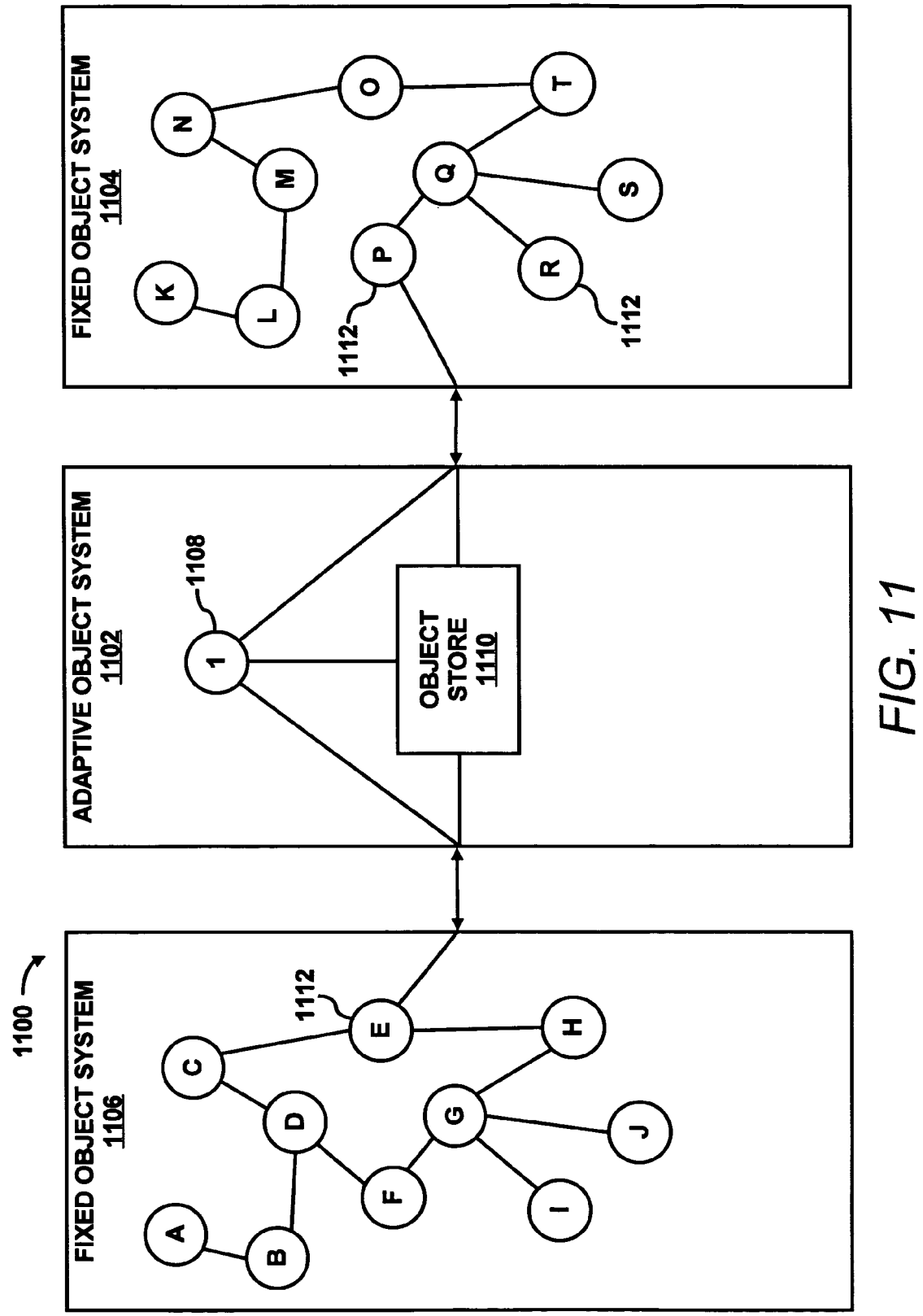
FIG. 11 shows a schematic diagram an adaptive object system and two fixed object systems each having multiple objects in accordance with an example of an object discovery system.

In FIG. 11, there is shown a schematic diagram of a heterogeneous object system 1100 having an adaptive object system 1102, a first type of fixed object system 1104 and a second type of fixed object system 1106. The adaptive object system 1102 includes one object 1108 and an object store 1110. Each fixed object system 1104 and 1106 includes multiple objects 1112 labeled A-T in the Figure. Once the object 1108 discovers a reference to the object, for instance, object 1112p, in the fixed object system 1104, it places the discovered object reference into the object store 1110. Object 1112p knows a reference to object 1112q, therefore, object 1108 may also obtain the reference to object 1112q by performing a call to object 1112p, and may store the discovered reference to object 1112q into the object store 1110. Object 1112q also knows references to objects 1112r, 1112s and 1112t, therefore, object 1108 may also obtain the references to those objects via the calls to object 1112q. This object discovery process may continue until object 1108 discovers all the objects 1112k-1112t and store their object references in the object store 1110.

Additionally, object 1112e, for example, knows a reference to object 1108. Since object 1108 knows how to retrieve object references from the object store 1110, object 1112e now knows references to objects 1112k-1112t located in the fixed object system 1104, by performing a call to the object 1108. Therefore, once an initial discovery between object systems is made, discovery may continue until all the objects referenced by the initially discovered object are discovered.

Figure 12:
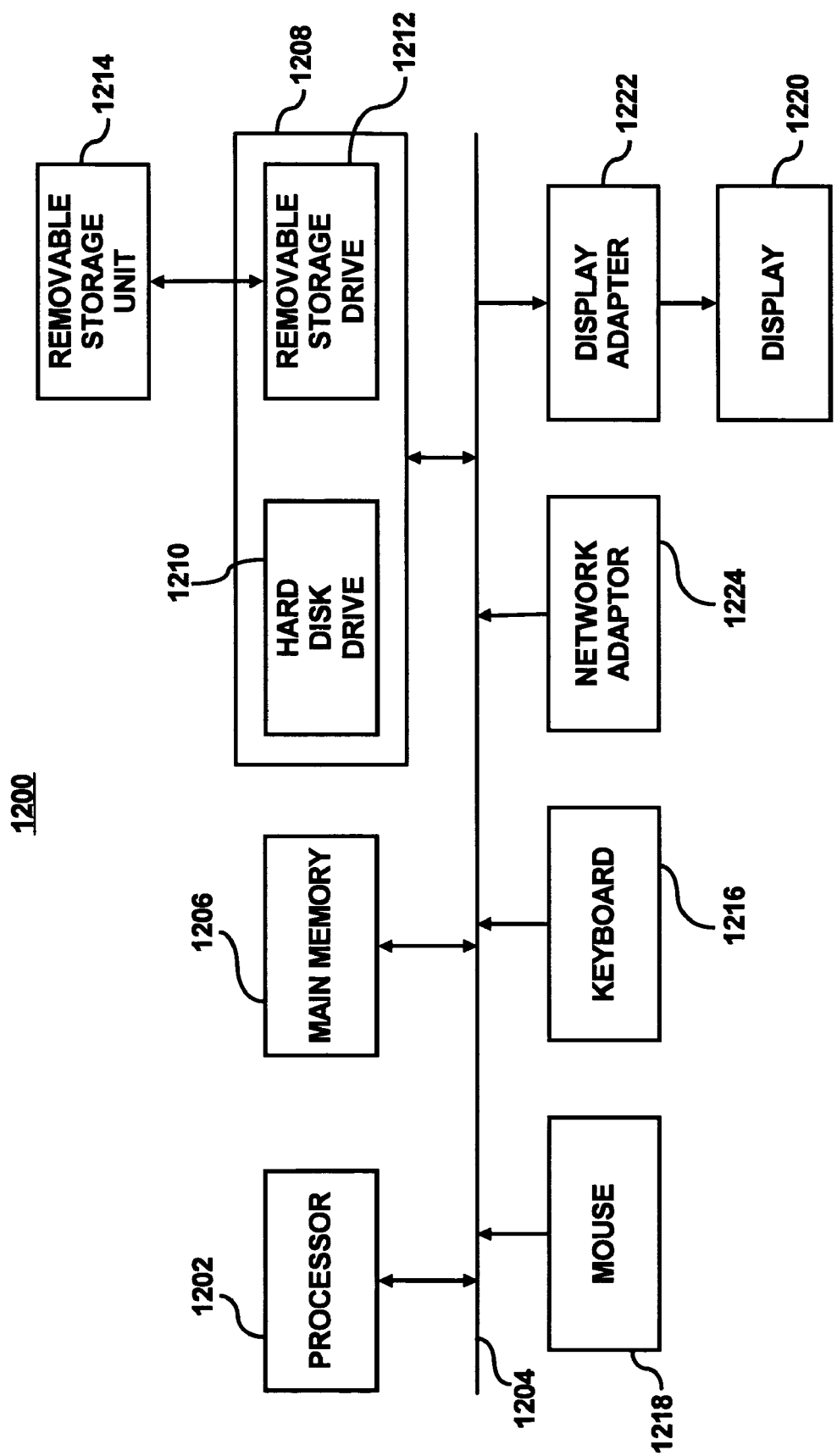
FIG. 12 illustrates an exemplary block diagram of a computer system that may include the heterogeneous object systems shown in FIGS. 1, 4 and 7.

FIG. 12 illustrates an exemplary block diagram of a computer system 1200 that may include the heterogeneous object systems 100, 400 and 700 shown in FIGS. 1, 4 and 7. The computer system 1200 includes one or more processors, such as processor 1202, providing an execution platform for executing the methods described hereinabove.

Commands and data from the processor 1202 are communicated over a communication bus 1204. The computer system 1200 also includes a main memory 1206, which is a computer readable medium such as a Random Access Memory (RAM), where software may be executed during runtime, and a secondary memory 1208. The secondary memory 1208 includes a computer readable medium that is, for example, a hard disk drive 1210 and/or a removable storage drive 1212, representing a floppy diskette drive, a magnetic tape drive, a compact disk drive, etc., or a nonvolatile memory where a copy of the software may be stored. The secondary memory 1208 may also include other computer readable media such as ROM (read only memory), EPROM (erasable, programmable ROM), EEPROM (electrically erasable, programmable ROM). In addition to software, routing tables, the global information table, and measured QoS characteristics may be stored in the main memory 1206 and/or the secondary memory 1208. The removable storage drive 1212 reads from and/or writes to a removable storage unit 1214 in a well-known manner.

A user interfaces with the computer system 1200 with one or more input devices, such as a keyboard 1216, a mouse 1218, a stylus, and the like. The display adaptor 1222 interfaces with the communication bus 1204 and the display 1220 and receives display data from the processor 1202 and converts the display data into display commands for the display 1220. A network interface 1224 may also be provided for communicating with other nodes via a network.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which intended to be defined by the following claims and their equivalents in which all terms are meant in their broadest reasonable sense unless otherwise indicated.

What is claimed is:

1. A system encoded in a computer readable medium for execution by a computer system to provide object discovery in heterogeneous object systems, the system comprising:

a fixed object system having a registry;

a callee object having a rendezvous name, the callee object being registered in the registry of the fixed object system under the rendezvous name, wherein the rendezvous name is a designation of the callee object obtained by converting a common name of the callee object in an object system in which the callee object will run; and an adaptive object system having a remote procedure call protocol abstraction layer and a caller object, the caller object being configured to issue a discovery request, wherein the remote procedure call protocol abstraction layer includes an object discovery protocol configured to receive the discovery request including the common name of the callee object, to convert the common name to the rendezvous name, and to use the rendezvous name to search the registry of the fixed object system to discover a reference to the callee object.

2. The system of claim 1, wherein the fixed object system includes the callee object, the callee object further comprising registration code including the common name and wherein the common name is converted to the rendezvous name in the fixed object system.

3. The system of claim 1, wherein the caller object further comprises helper code including the common name and wherein the common name is converted to the rendezvous name in the object discovery protocol.

4. The system of claim 2, further comprising a second fixed object system having a caller object and a registry, the caller object including the common name.

5. The system of claim 4, wherein the adaptive object system further includes a server application, the server application being configured to issue a registration request.

6. The system of claim 5, wherein an object registration protocol is configured to handle the registration request from the server application and register an object reference held by the server application in the registry of the second fixed object system under the rendezvous name.

7. The system of claim 6, wherein the server application further comprises registration code including the common name and wherein the common name is converted to the rendezvous name in the object registration protocol.

8. The system of claim 1, wherein the adaptive object system further includes a callee object, the callee object being configured to issue a registration request.

9. The system of claim 8, wherein an object registration protocol is configured to handle the registration request from the callee object and register the callee object into the registry of the fixed object system under the rendezvous name.

10. The system of claim 9, wherein the callee object of the adaptive object system further comprises registration code including the common name and wherein the common name is converted to the rendezvous name in the object registration protocol.

11. The system of claim 10, wherein the fixed object system includes a caller object, the caller object having the rendezvous name.

12. The system of claim 1, further comprising a plurality of fixed object systems and wherein the adaptive object system further comprises a plurality of remote procedure call protocol abstraction layer instances, each of said remote procedure call protocol abstraction layer instances being configured to communicate with one of the plurality of fixed object systems.

13. The system of claim 12, further comprising a transport registry for object reference mapping between the plurality of fixed object systems and the adaptive object system.

14. A system encoded in a computer readable medium for execution by a computer system to provide object discovery in heterogeneous object systems, the system comprising:
a fixed object system having a registry;
a callee object having a rendezvous name, the callee object being registered in the registry of the fixed object system under the rendezvous name, wherein the rendezvous name is a designation of the callee object obtained by converting a common name of the callee object in an object system in which the callee object will run; and
an adaptive object system having a remote procedure call protocol abstraction layer,
and a server application, the server application being configured to issue a discovery request,
wherein the remote procedure call protocol abstraction layer includes an object discovery protocol configured to receive the discovery request including the common name of the callee object, to convert the common name to the rendezvous name, and to use the rendezvous name to search the registry of the fixed object system to discover a reference to the callee object.

15. The system of claim 14, wherein the server application further comprises helper code including the common name and wherein the common name is converted to the rendezvous name in the object discovery protocol.

16. The system of claim 15, further comprising a second fixed object system having a caller object and a registry, the caller object including the common name.

17. The system of claim 16, wherein the server application is further configured to issue a registration request.

18. The system of claim 17, wherein an object registration protocol is configured to handle the registration request from the server application and register the discovered callee object reference to the registry of the second fixed object system under the rendezvous name.

19. The system of claim 18, wherein the server application further comprises registration code including the common name and wherein the common name is converted to the rendezvous name in the object registration protocol.

20. A method for object discovery in heterogeneous object systems, comprising the steps of:
registering a callee object in a registry of a fixed object system under a rendezvous name, wherein the rendezvous name is a designation of the callee object obtained by converting a common name of the callee object in an object system in which the callee object will run;
requesting a reference to the callee object using the rendezvous name by an adaptive object system having a remote procedure call protocol abstraction layer, wherein the remote procedure call protocol abstraction layer includes an object discovery protocol, the object discovery protocol receiving a discovery request including the common name of the callee object, converting the common name to the rendezvous name, and searching the registry of the fixed object system using the rendezvous name to find the reference to the callee object;
discovering the reference to the callee object; and
providing registration code including a common name to the callee object.

21. The method of claim 20, further comprising the step of converting the common name to the rendezvous name in the fixed object system.

22. The method of claim 21, wherein the step of registering the callee object further comprises registering the callee object using the registration code.

23. The method of claim 20, further comprising the step of providing helper code including a common name to a caller object in the adaptive object system and wherein the step of requesting the reference to the callee object further comprises the step of requesting the reference to the callee object using the helper code.

24. The method of claim 23, further comprising the step of converting the common name to the rendezvous name in the adaptive object system.

25. The method of claim 20, further comprising the step of providing helper code including common name to a server application in the adaptive object system and wherein the step of requesting the reference to the callee object further comprises the step of requesting the reference to the callee object using the helper code.

26. The method of claim 25, further comprising the steps of providing registration code including the common name to the server application and registering a second reference to the callee object in a second registry of a second fixed object system.

27. The method of claim 26, further comprising the step of discovering the second reference to the callee object.

28. The method of claim 20, wherein the step of registering the callee object further comprises converting the common name to the rendezvous name in the adaptive object system.

29. The method of claim 28, further comprising the step of providing the common name to a caller object in the fixed object system.

30. The method of claim 20, further comprising the steps of registering a plurality of callee objects in a plurality of fixed object systems and discovering a plurality of references to the callee objects.

31. The method of claim 20, further comprising the step of using the callee object to discover references to other objects referenced by the callee object in the fixed object system.

32. A system for object discovery in heterogeneous object systems, comprising:
- a fixed object system having a callee object and a registry;
- an adaptive object system having a caller object;
- means for registering the callee object in the registry under a rendezvous name, wherein the rendezvous name is a designation of the callee object obtained by converting a common name of the callee object in an object system in which the callee object will run;
- means for issuing a discovery request from the caller object;
- means for receiving the discovery request including the common name of the callee object;
- means for converting the common name to the rendezvous name;
- means for searching the registry of the fixed object system using the rendezvous name to discover a reference to the callee object; and
- means for returning the reference to the caller object,
- wherein the callee object includes registration code having the common name and wherein the means for registering the callee object further includes means for converting the common name to the rendezvous name.

33. The system of claim 32, wherein the caller object includes helper code having the common name.

34. A system for object discovery in heterogeneous object systems, comprising:
- a fixed object system having a caller object and a registry;
- an adaptive object system having a callee object;
- means for registering the callee object in the registry under a rendezvous name, wherein the rendezvous name is a designation of the callee object obtained by converting a common name of the callee object in an object system in which the callee object will run;
- means for issuing a discovery request;
- means for receiving the discovery request including the common name of the callee object;
- means for converting the common name to the rendezvous name;
- means for searching the registry of the fixed object system using the rendezvous name to discover a reference to the callee object; and
- means for returning the reference to the caller object,
- wherein the callee object includes registration code having a common name and wherein the means for registering the callee object further includes means for converting a common name to the rendezvous name.

35. The system of claim 34, further comprising means for registering the reference.

36. A system for object discovery in heterogeneous object systems, comprising:
- a first fixed object system having a callee object and a first registry;
- a second fixed object system having a caller object and a second registry;
- an adaptive object system having a server application;
- means for registering the callee object in the first registry under a rendezvous name, wherein the rendezvous name is a designation of the callee object obtained by converting a common name of the callee object in an object system in which the callee object will run;
- means for registering the callee object in the second registry under the rendezvous name;
- means for issuing a discovery request;
- means for receiving the discovery request including the common name of the callee object;
- means for converting the common name to the rendezvous name;
- means for searching the first registry using the rendezvous name to discover a first reference to the callee object;
- means for searching the second registry to discover a second reference to the callee object; and
- means for mapping requests from the caller object to the callee object using the first and second references,
- wherein the callee object includes registration code having a common name and wherein the means for registering the callee object further includes means for converting the common name to the rendezvous name.

37. The system of claim 36, wherein the server application includes helper code having the common name.

38. The system of claim 37, further comprising means for generating the registration code and the helper code.

39. The system of claim 36, wherein the server application includes registration code having a common name and wherein the means for registering the callee object in the second fixed object system further includes means for converting the common name to the rendezvous name.

40. The system of claim 39, wherein the server application includes helper code having the common name and wherein the means for searching the first registry further includes means for converting the common name to the rendezvous name.

41. A computer readable medium on which is embedded one or more computer programs, said one or more computer programs implementing a method for object discovery in heterogeneous object systems, said one or more computer programs when executed by a processor performs the steps of:
- registering a callee object in a registry of a fixed object system under a rendezvous name, wherein the rendezvous name is a designation of the callee object obtained by converting a common name of the callee object in an object system in which the callee object will run;
- requesting a reference to the callee object using the rendezvous name by an adaptive object system having a remote procedure call protocol abstraction layer, wherein the remote procedure call protocol abstraction layer includes an object discovery protocol, the object discovery protocol receiving a discovery request including the common name of the callee object, converting the common name to the rendezvous name, and searching the registry of the fixed object system using the rendezvous name to find the reference to the callee object;
- discovering the reference to the callee object; and
- providing registration code including a common name to the callee object.

42. The computer readable medium according to claim 41, the one or more computer programs further comprising a set of instructions for converting the common name to the rendezvous name in the fixed object system.

43. The computer readable medium according to claim 42, wherein the one or more computer programs for registering the callee object further comprises a set of instructions for registering the callee objecting using the registration code.

44. The computer readable medium according to claim 41, the one or more computer programs further comprising a set of instructions for providing helper code including a common name to a caller object in the adaptive object system and wherein one or more computer programs for requesting the reference to the callee object further comprises a set of instructions for requesting the reference to the callee object using the helper code.

45. The computer readable medium according to claim 44, the one or more computer programs further comprising a set of instructions for converting the common name to the rendezvous name in the adaptive object system.

46. The computer readable medium according to claim 41, the one or more computer programs further comprising a set of instructions for providing helper code including a common name to a server application in the adaptive object system and wherein one or more computer programs for requesting the reference to the callee object further comprises a set of instructions for requesting the reference to the callee object using the helper code.

47. The computer readable medium according to claim 46, the one or more computer programs further comprising a set of instructions for providing registration code including the common name to the server application and registering a second reference to the callee object in a second registry of a second fixed object system.

48. The computer readable medium according to claim 47, the one or more computer programs further comprising a set of instructions for discovering the second reference to the callee object.

49. The computer readable medium according to claim 41, wherein the one or more computer programs for registering the callee object further comprises a set of instructions for converting the common name to the rendezvous name in the adaptive object system.

50. The computer readable medium according to claim 49, the one or more computer programs further comprising a set of instructions for providing the common name to a caller object in the fixed object system.

\* \* \* \* \*